United States Patent
Yiu et al.

(10) Patent No.: US 11,617,112 B2
(45) Date of Patent: *Mar. 28, 2023

(54) BEAMFORMING MEASUREMENTS BASED ON PSS/SSS

(71) Applicant: Apple Inc., Cupertino, CA (US)

(72) Inventors: Candy Yiu, Portland, OR (US); Rui Huang, Beijing (CN); Yang Tang, San Jose, CA (US); Youn Hyoung Heo, Seoul (KR); Ansab Ali, Hillsboro, OR (US); Sudeep K. Palat, Cheltenham (GB); Dae Won Lee, Portland, OR (US); Jie Cui, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/164,561

(22) Filed: Feb. 1, 2021

(65) Prior Publication Data

US 2021/0160747 A1    May 27, 2021

Related U.S. Application Data

(63) Continuation of application No. 16/471,506, filed as application No. PCT/US2017/064751 on Dec. 5, 2017, now Pat. No. 10,911,996.

(Continued)

(51) Int. Cl.
*H04W 36/00* (2009.01)
*H04J 11/00* (2006.01)
(Continued)

(52) U.S. Cl.
CPC ..... *H04W 36/0085* (2018.08); *H04J 11/0069* (2013.01); *H04W 16/28* (2013.01);
(Continued)

(58) Field of Classification Search
CPC ............ H04W 16/28; H04W 36/0085; H04W 36/06; H04W 36/08; H04W 36/30; H04J 11/0069
See application file for complete search history.

(56) References Cited

U.S. PATENT DOCUMENTS 10,911,996 B2 *  2/2021  Yiu ................... H04W 36/0085

FOREIGN PATENT DOCUMENTS

| WO | 2016163786 | 10/2016 |
|----|------------|---------|
| WO | 2018118419 | 6/2018  |

OTHER PUBLICATIONS

"Initial access in non-standalone scenario", Fujitsu, R1-1612274, 3GPP TSG RAN \NG1 Meeting #87, Reno, USA, (Nov. 4, 2016).
"International Application Serial No. PCT/US2017/064751, International Search Report dated Apr. 10, 2018", 3 pgs.
(Continued)

*Primary Examiner* — Elton Williams
(74) *Attorney, Agent, or Firm* — Kowert, Hood, Munyon, Rankin & Goetzel, P.C.

(57) ABSTRACT

Beamforming measurement techniques based on PSS/SSS are disclosed. An apparatus of a user equipment (UE) can include processing circuitry configured to decode a configuration message from a source serving cell, the configuration message indicating signal selection criteria for cell measurement reporting. A synchronization signal (SS) burst set associated with one or more transmission/reception points (TRPs) within a neighboring cell is decoded, the SS burst set including a plurality of SS blocks. A cell beamforming measurement signal associated with the neighboring cell is generated, based on signal measurements of the SS blocks and the signal selection criteria. A radio resource management (RRM) measurement report message is encoded for transmission to the serving cell, the measurement report message including the cell beamforming measurement sig- (Continued)

nal. A handover command message for initiating a handover to the neighboring cell is decoded, the handover command based on the cell beamforming measurement signal.

20 Claims, 16 Drawing Sheets

Related U.S. Application Data

(60) Provisional application No. 62/436,911, filed on Dec. 20, 2016.

(51) Int. Cl.
*H04W 16/28* (2009.01)
*H04W 36/06* (2009.01)
*H04W 36/08* (2009.01)
*H04W 36/30* (2009.01)

(52) U.S. Cl.
CPC ............ *H04W 36/06* (2013.01); *H04W 36/08* (2013.01); *H04W 36/30* (2013.01)

(56) References Cited

OTHER PUBLICATIONS

"International Application Serial No. PCT/US2017/064751, Written Opinion dated Apr. 10, 2018", 5 pgs.
"Mobility for NR", Intel Corporation, R1-1611971, 3GPP TSG RAN \NG1 Meeting #87, Reno, USA, (Nov. 6, 2016).
"On NR initial access and mobility", Intel Corporation, R1-1610402, 3GPP TSG RAN \NG1 Meeting #86bis, Lisbon, Portugal, (Oct. 1, 2016).
Zte, et al., "Consideration on the RRM Measurement for NR", R2-167836, 3GPP TSG RAN \NG2 Meeting #96, Reno, USA, (Nov. 4, 2016).

* cited by examiner

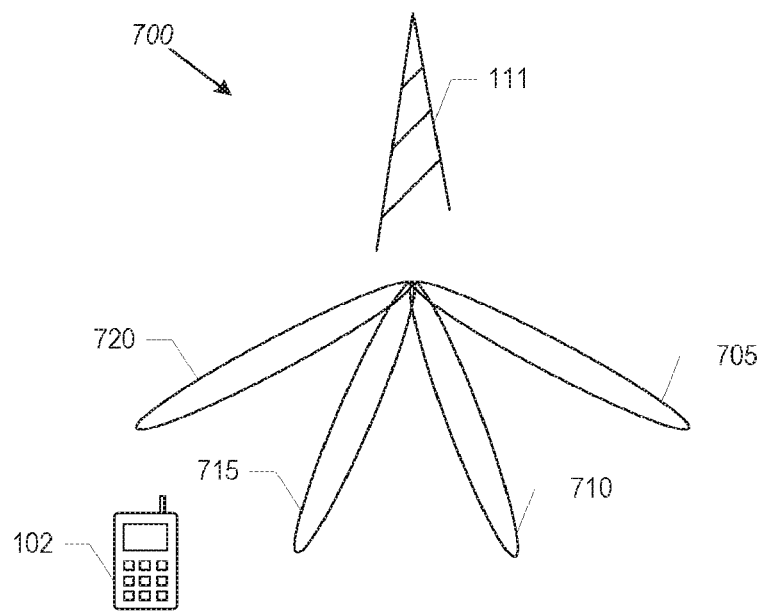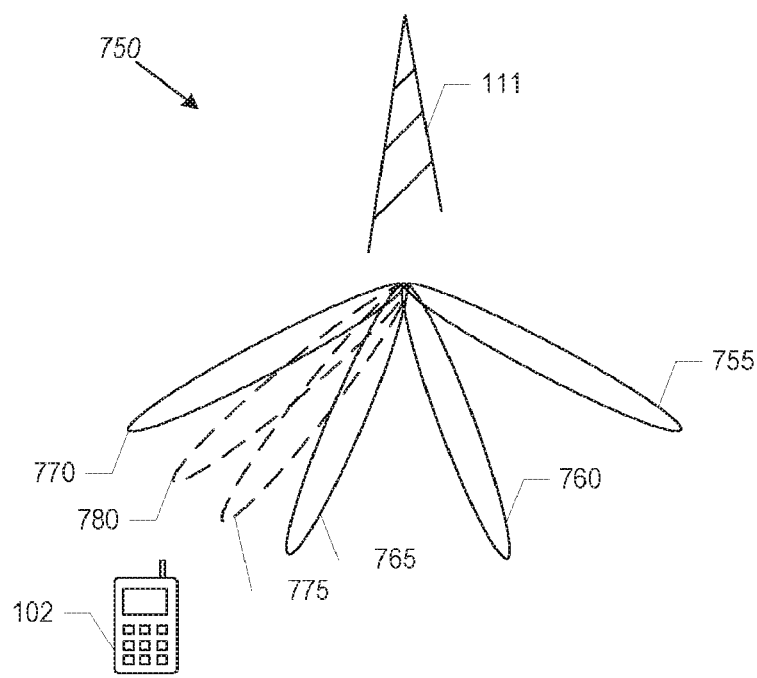
FIG. 7

BEAMFORMING MEASUREMENTS BASED ON PSS/SSS

PRIORITY CLAIM

This application is a continuation of U.S. application Ser. No. 16/471,506, filed Jun. 19, 2019, which is a U.S. National Stage Filing under 35 U.S.C. 371 from International Application No. PCT/US2017/064751, filed Dec. 5, 2017, which claims the benefit of priority to U.S. Provisional Patent Application Ser. No. 62/436,911, filed Dec. 20, 2016, and entitled "MEASUREMENT BASED ON 10 PSS/SSS ONLY PER CELL," each of which is incorporated herein by reference in its entirety.

TECHNICAL FIELD

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

BACKGROUND

Mobile communication has evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. The use of networked UEs using 3GPP LTE systems has increased in all areas of home and work life. Fifth generation (5G) wireless systems are forthcoming, and are expected to enable even greater speed, connectivity, and usability.

Next generation 5G networks are expected to increase throughput, coverage, and robustness. As current cellular network frequency is saturated, high frequency, such as millimeter wave (mmWave) is an attractive choice due to its high bandwidth. However, due to the high path loss, beamforming both at the network and at the user equipment (UE) can be used to increase antenna gain and to compensate reduced signal propagation associated with high frequency communications. When both the network and the UE are beamforming, there can be many challenges, including discovery and measurement to assist with beamforming.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 7 illustrates examples of multiple beam transmissions in accordance with some aspects.

DETAILED DESCRIPTION

Figure 1A:
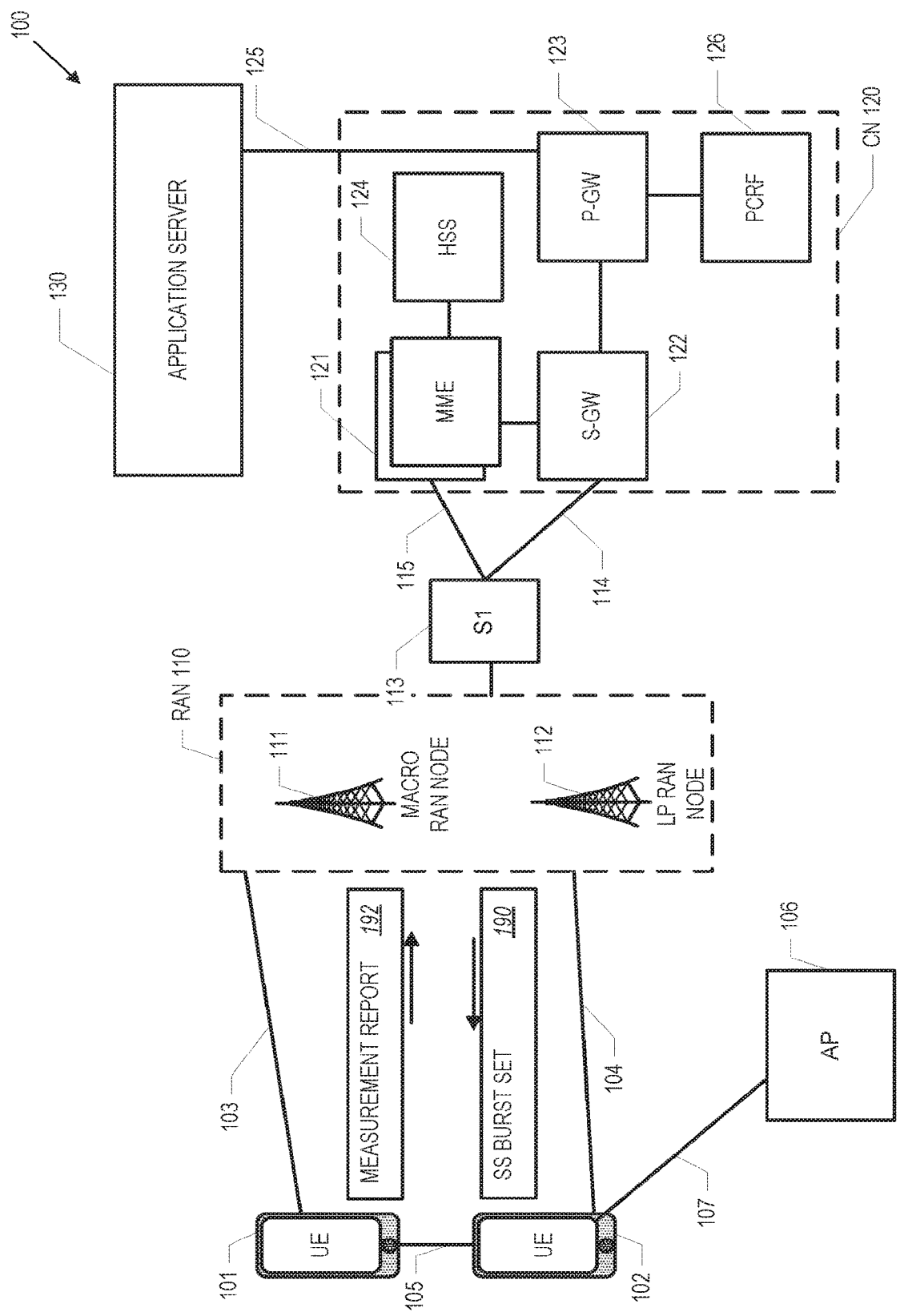
FIG. 1A illustrates an architecture of a network in accordance with some aspects.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a TIIird Generation Partnership Project 10 (3GPP) radio communication technology, for example Universal Mobile Telecommunications System (UMTS), Freedom of Multimedia Access (FOMA), 3GPP Long Term Evolution (L TE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD\ High-Speed CircuitSwitched Data (HSCSD), Universal Mobile Telecommunications System (Third Generation) (UMTS (3G)), Wideband Code Division Multiple Access (Universal Mobile Telecommunications System) (\V-CDMA (UMTS)), High Speed Packet Access (HSPA), High-Speed Downlink 20 Packet Access (HSDPA), High-Speed Uplink Packet Access (HSUP A), High Speed Packet Access Plus (HSPA+)" Universal Mobile Telecommunications System-Time-Division Duplex (UMTS-TDD)" Time Division-Code Division Multiple Access (TD-CDMA), Time DivisionSynchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 ($3^{rd}$ Generation Partnership Project Release 11), 3GPP Rel. 12 (3rd Generation Partnership Project Release 12), 3GPP Rel. 13 (3rd Generation Partnership 30 Project Release 13), 3GPP Rel. 14 (3rd Generation Partnership Project Release 14), 3GPP Rd. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 ($3^{rd}$ Generation Partnership Project Release 18), 3GPP 5G, 3GPP LTE Extra LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Tem 1 Evolution Advanced ($4^{th}$ 5 Generation) (LTE Advanced (4G)), cdmaOne (2G), Code division rnuHiple access 2000 (Third generation) (CDIVJA2000 (3G)), Evolution-Data Optimized or Evolution-Data Only (EV-DO), Advanced Mobile Phone System (1st Generation) (AMPS (1G)), Total Access Communication System/Extended Total Access Communication System (T ACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig LandmobiJ Telefoni, Public Land Mobile Telephony), MTD (Swedish abbreviation for Mobilte!efonisystem D, or Mobile telephony system D), Public Automated Land Mobile (Autotel/P ALM), ARP (Finnish for Autorndiopuhehn, "car radio phone"), NMT (Nordic Mobile Telephony), High capacity version of NTT (Nippon Telegraph and Telephone) (Hicap), Cellular Digital Packet Data (CDPD), Mobitex, DataTAC Integrated Digital Enhanced Network (iDEN), Personal Digital Cellular (PDC), Circuit Switched Data (CSD), Personal Handy-phone System (PHS), Wideband Integrated Digital Enhanced Network (\:ViDEN), iBurst, Unlicensed Mobile Access (UMA), also referred to as 3GPP Generic Access Network, or GAN standard), Zigbee, Bluetooth(r), Wireless Gigabit Alliance (WiGig) standard, mrnWave standards in general (wireless systems operating at 10-300 GHz and above such as WiGig, IEEE 802.llad, IEEE 802.llay, etc.), technologies operating above 300 GHz and THz bands, (3GPP/LTE band or IEEE 802.11 p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as lntelligent-Transport-Systems and others, etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHL, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or to any computing device including a wireless communications interface.

In some aspects, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, RAN 110 can include NG RAN or NG Core RAN. The NG RAN 110 can include various functions, such as an access and mobility management function (AMF), a session management function (SMF), a user plane function (UPF), a policy control function (PCF), a unified data management (UDM) function, and a network function (NF) repository function (NRF). The AMF can be used to manage access control and mobility, and can also include network slice selection functionality. The SMF can be configured to set up and manage various sessions according to a network policy. The UPF can be deployed in one or more configurations according to a desired service type. The PCF can be configured to provide a policy framework using network slicing, mobility management, and roaming (similar to PCRF in a 4G communication system). The UDM can be configured to store subscriber profiles and data (similar to an HSS in a 4G communication system).

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB) or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the aspects is not limited in this respect. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN. In this aspect the S interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this aspect, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

In an example, any of the nodes 111 or 112 can be configured to communicate to the UEs 101/102 (e.g., dynamically) an antenna panel selection and a receive (Rx) beam selection that should be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101/102 (e.g., dynamically) an antenna panel selection and a transmit (Tx) beam selection that should be used by the UE for data transmission on a physical uplink shared channel (PUSCH) as well as for sounding reference signal (SRS) transmission.

In some aspects, LTE-based communications can use a fixed transmission time interval (TTI) length of 1 ms with 12-14 symbols, or a smaller TTI can also be used (e.g., in NR-based communications). The transmission of a request, grant, or data can be achieved by using one or more subframes with a TTI. In this regard, the TTI length can impact both the time for transmitting over the air as well as the processing time at transmitters and receivers.

In accordance with some techniques and aspects described herein, radio resource management (RRM) beamforming measurements can be based on one or more reference signals received within a cell. For example, one or more of a primary synchronization signal (PSS), a secondary synchronization signal (SSS), and a new radio synchronization signal (NRSS) can be used in connection with cell beamforming measurements and cell reporting. In some aspects, the synchronization signals used for cell reporting and beamforming can be transmitted over a communication beam that is wider than a communication beam used for a data channel. In some aspects, the synchronization signals can be broadcast via SFN. In in some aspects as described herein, the synchronization signals can be transmitted in a synchronization signal (SS) burst set (e.g., 190), which can be communicated periodically to the UE (e.g., 102). In some aspects, the synchronization signals within the SS burst set can include cell ID information. In response to the SS burst set 190, the UE can perform various signal measurements and include a cell beamforming measurements signal (and/or one or more beam reporting signals) within a measurement report 192 communicated back to the RAN 110.

Further description of various techniques to generate beamforming measurements using synchronization signals within an SS burst or described herein below in reference to FIGS. 7-15.

Figure 1B:
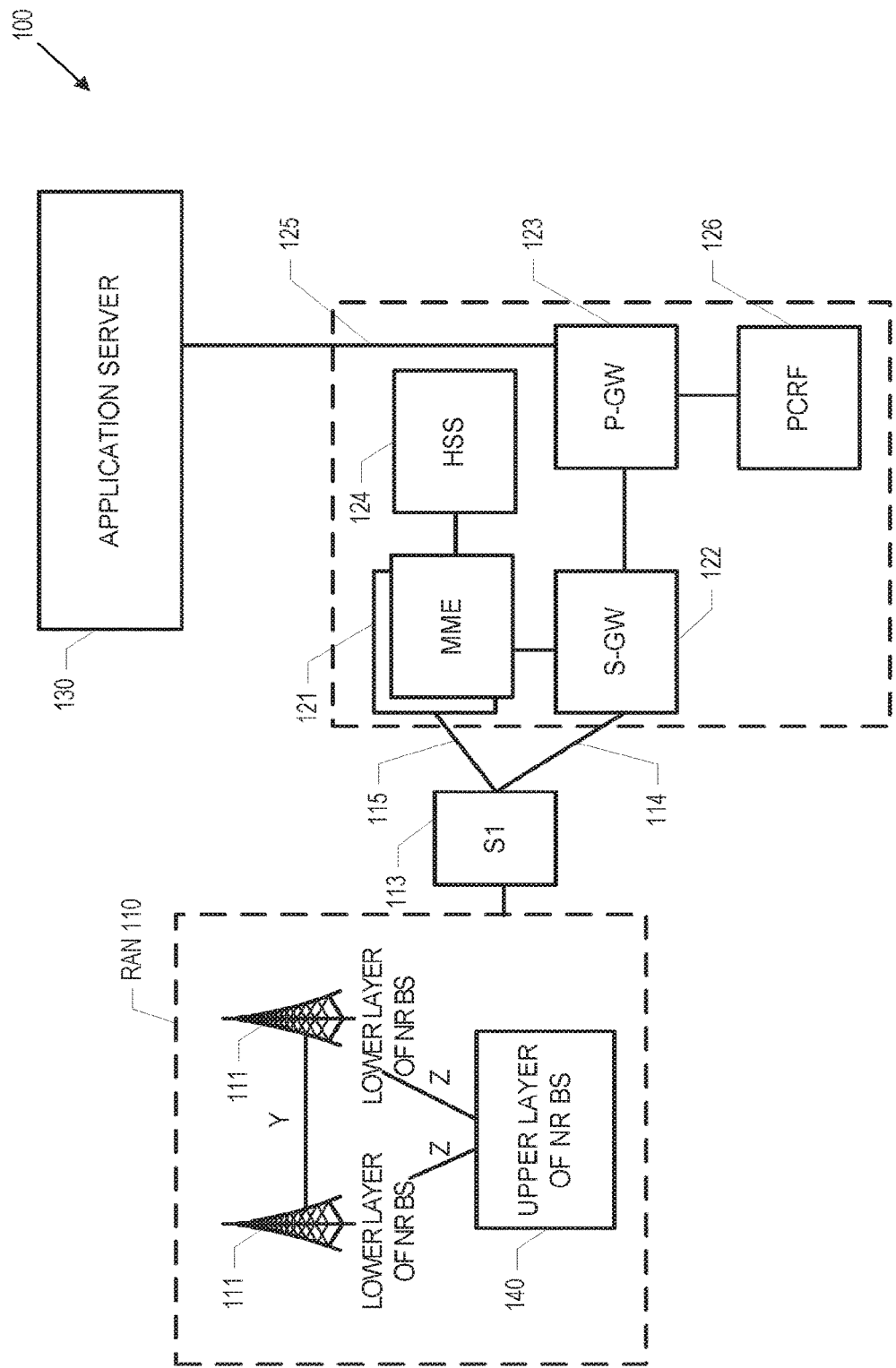
FIG. 1B is a simplified diagram of a next generation wireless network in accordance with some aspects.

FIG. 1B is a simplified diagram of a next generation wireless network in accordance with some aspects. The wireless network may be similar to that shown in FIG. 1A but may contain components associated with a 5G network. The wireless network may contain, among other elements not shown, a RAN 110 coupled to the core network 120 (as well as to the Internet which can connect the core network 120 with other core networks 120). In some aspects, the RAN 110 and the core network 120 may be a next generation (5G) 3GPP RAN and 5G core network, respectively. The RAN 110 may include an upper layer of a new generation node-B (gNB) (also referred to as a new radio (NR) base station (BS) (ULNRBS)) 140 and multiple lower layers of different gNBs (NR BS (LLNRBS)) 111. The LLNRBSs 111 can be connected to the ULNRBS 140 via a Z interface. The Z interface can be open or proprietary. In some examples, the LLNRBS 111 can be referred to as a transmission-reception point (TRP). If the Z interface is proprietary, then the ULNRBS 140 and the LLNRBS 111 may be provided by the same vendor. The LLNRBS 111 can be connected by a Y interface, which may be equivalent to the LTE X2 interface. The ULNRBS 140 may be connected to the core network 120 through the S1 interface 113.

As used herein, the term circuitry may refer to, be part of, or include an Application Specific Integrated Circuit (ASIC), an electronic circuit, a processor (shared, dedicated, or group), or memory (shared, dedicated, or group) that executes one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. Aspects described herein may be implemented into a system using any suitably configured hardware or software.

Figure 2:
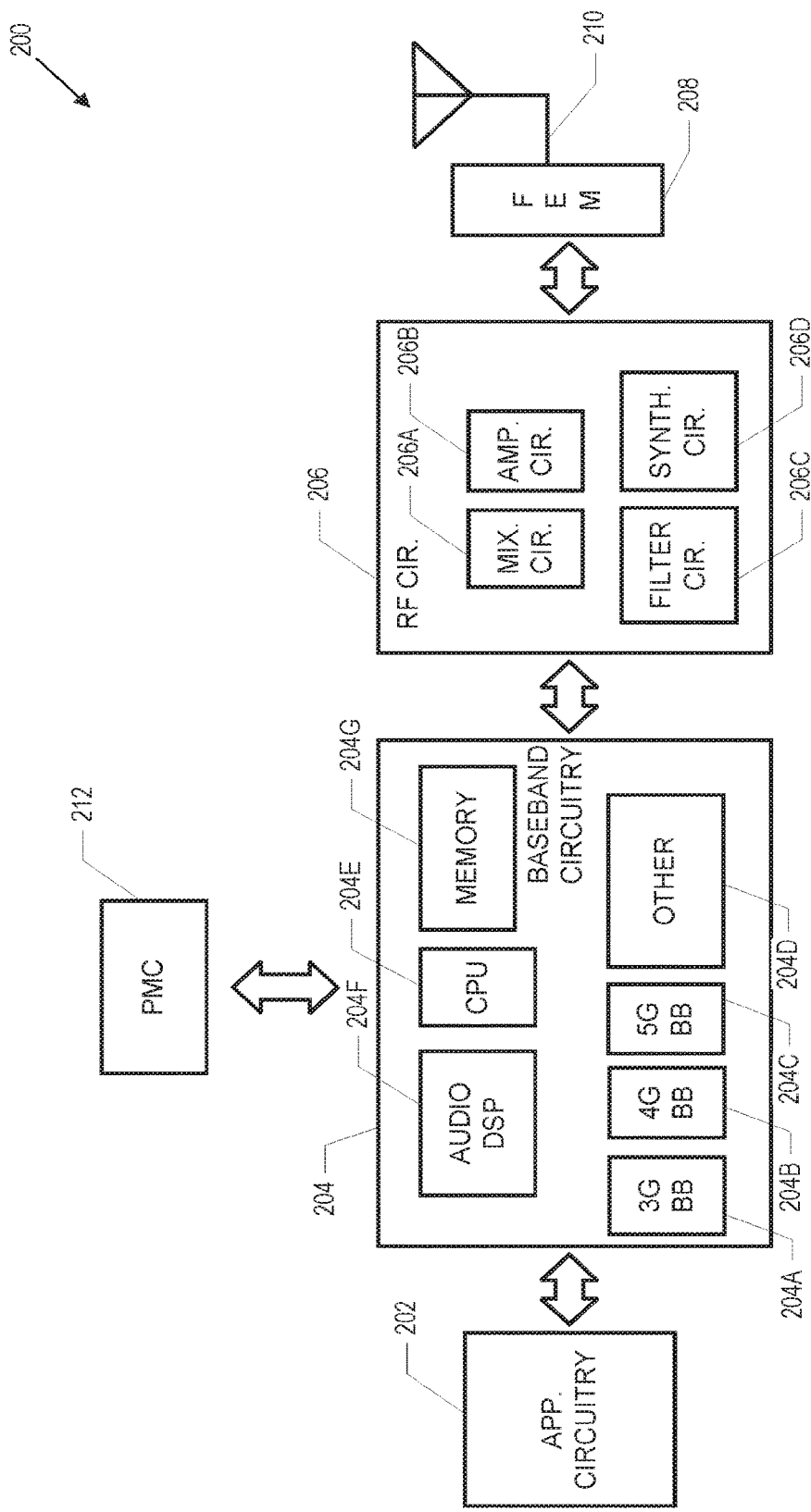
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include less elements (e.g., a RAN node may not utilize application circuitry 202, and instead include a processor/controller to process IP data received from an EPC). In some aspects, the device 200 may include additional elements such as, for example, memory/storage, display, camera, sensor, or input/output (I/O) interface. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/demapping functionality. In some aspects, encoding/decoding circuitry of the baseband circuitry 204 may include convolution, tail-biting convolution, turbo, Viterbi, or Low Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), a wireless personal area network (WPAN). Aspects in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include mixer circuitry 206A, amplifier circuitry 206B and filter circuitry 206C. In some aspects, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some aspects, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may be zero-frequency baseband signals, although this is not a requirement. In some aspects, mixer circuitry 206A of the receive signal path may comprise passive mixers, although the scope of the aspects is not limited in this respect.

In some aspects, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 204 and may be filtered by filter circuitry 206C.

In some aspects, the mixer circuitry 206A of the receive signal path and the mixer circuitry 206A of the transmit signal path may include two or more mixers and may be arranged for quadrature downconversion and upconversion, respectively. In some aspects, the mixer circuitry 206A of the receive signal path and the mixer circuitry 206A of the transmit signal path may include two or more mixers and may be arranged for image rejection (e.g., Hartley image rejection). In some aspects, the mixer circuitry 206A of the receive signal path and the mixer circuitry 206A may be arranged for direct downconversion and direct upconversion, respectively. In some aspects, the mixer circuitry 206A of the receive signal path and the mixer circuitry 206A of the transmit signal path may be configured for super-heterodyne operation.

In some aspects, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may be provided for processing signals for each spectrum, although the scope of the aspects is not limited in this respect.

In some aspects, the synthesizer circuitry 206D may be a fractional-N synthesizer or a fractional N/N+1 synthesizer, although the scope of the aspects is not limited in this respect as other types of frequency synthesizers may be suitable. For example, synthesizer circuitry 206D may be a delta-sigma synthesizer, a frequency multiplier, or a synthesizer comprising a phase-locked loop with a frequency divider.

The synthesizer circuitry 206D may be configured to synthesize an output frequency for use by the mixer circuitry 206A of the RF circuitry 206 based on a frequency input and a divider control input. In some aspects, the synthesizer circuitry 206D may be a fractional N/N+1 synthesizer.

In some aspects, frequency input may be provided by a voltage controlled oscillator (VCO), although that is not a requirement. Divider control input may be provided by either the baseband circuitry 204 or the applications processor 202 depending on the desired output frequency. In some aspects, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206D may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done solely in the RF circuitry 206, solely in the FEM 208, or in both the RF circuitry 206 and the FEM 208.

In some aspects, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM 208.

In some aspects, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may transition back to RRC_Connected state in order to receive data.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
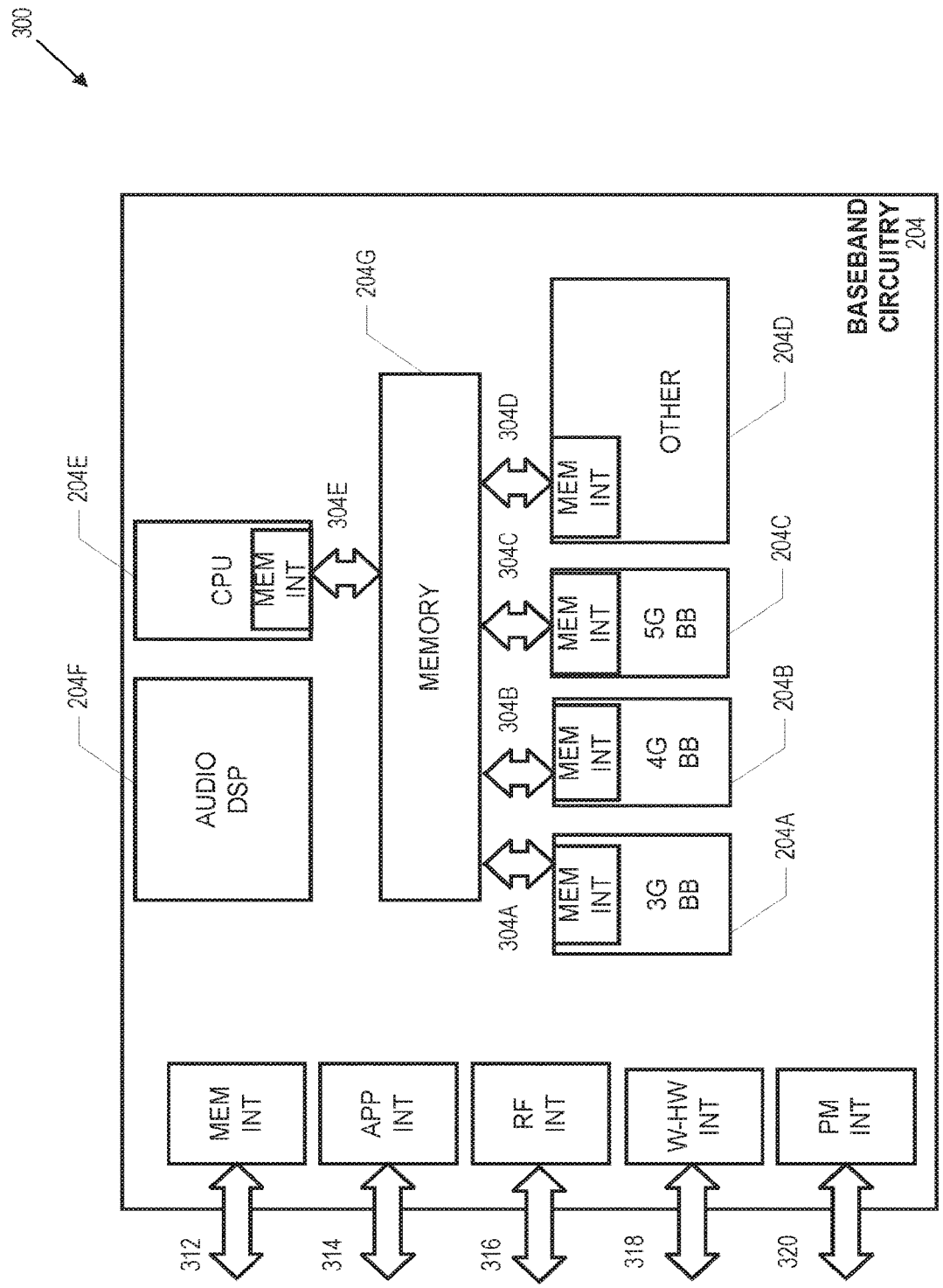
FIG. 3 illustrates example interfaces of baseband circuitry in accordance with some aspects.

FIG. 3 illustrates example interfaces of baseband circuitry in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send % receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
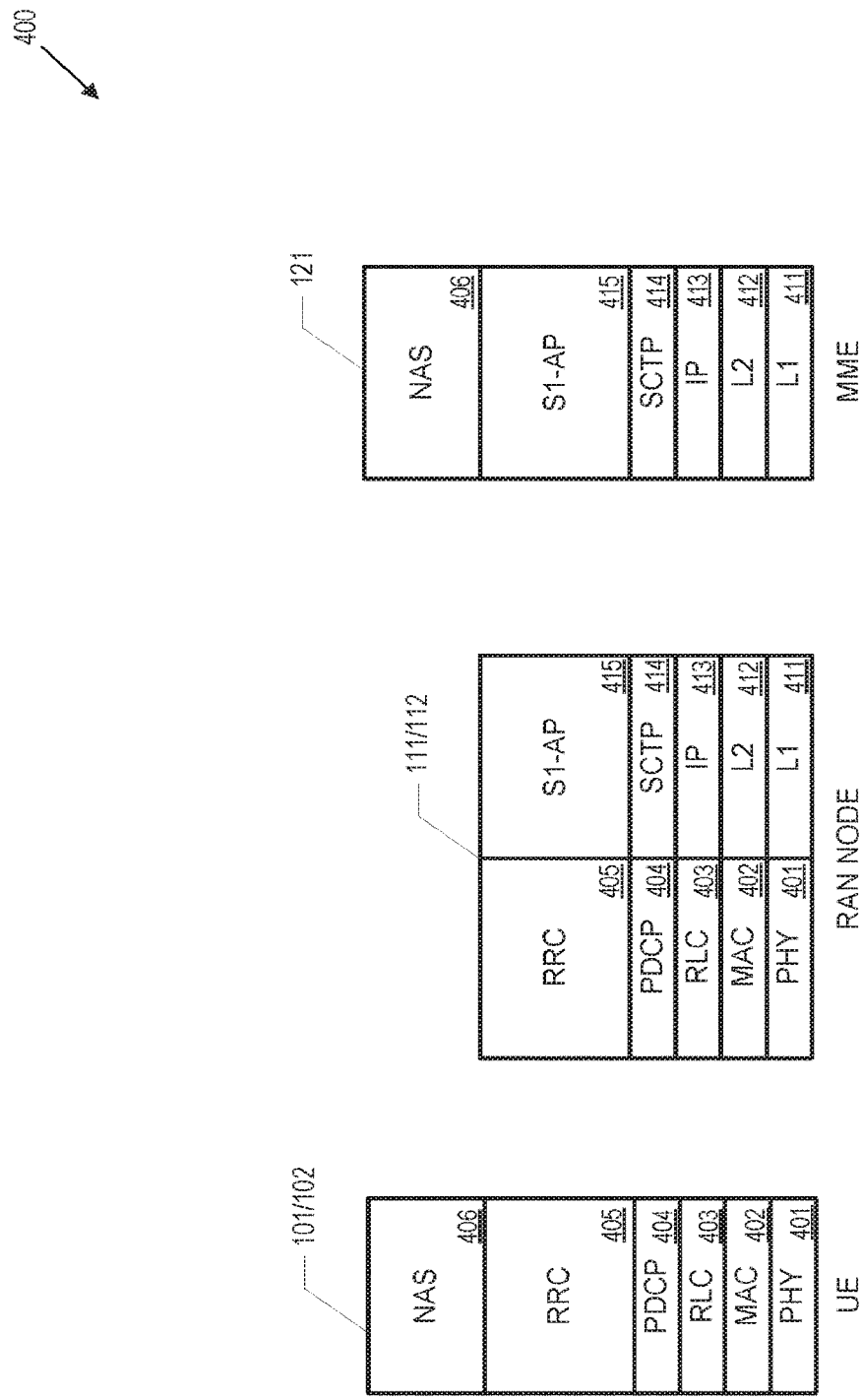
FIG. 4 is an illustration of a control plane protocol stack in accordance with some aspects.

FIG. 4 is an illustration of a control plane protocol stack in accordance with some aspects. In this aspect, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
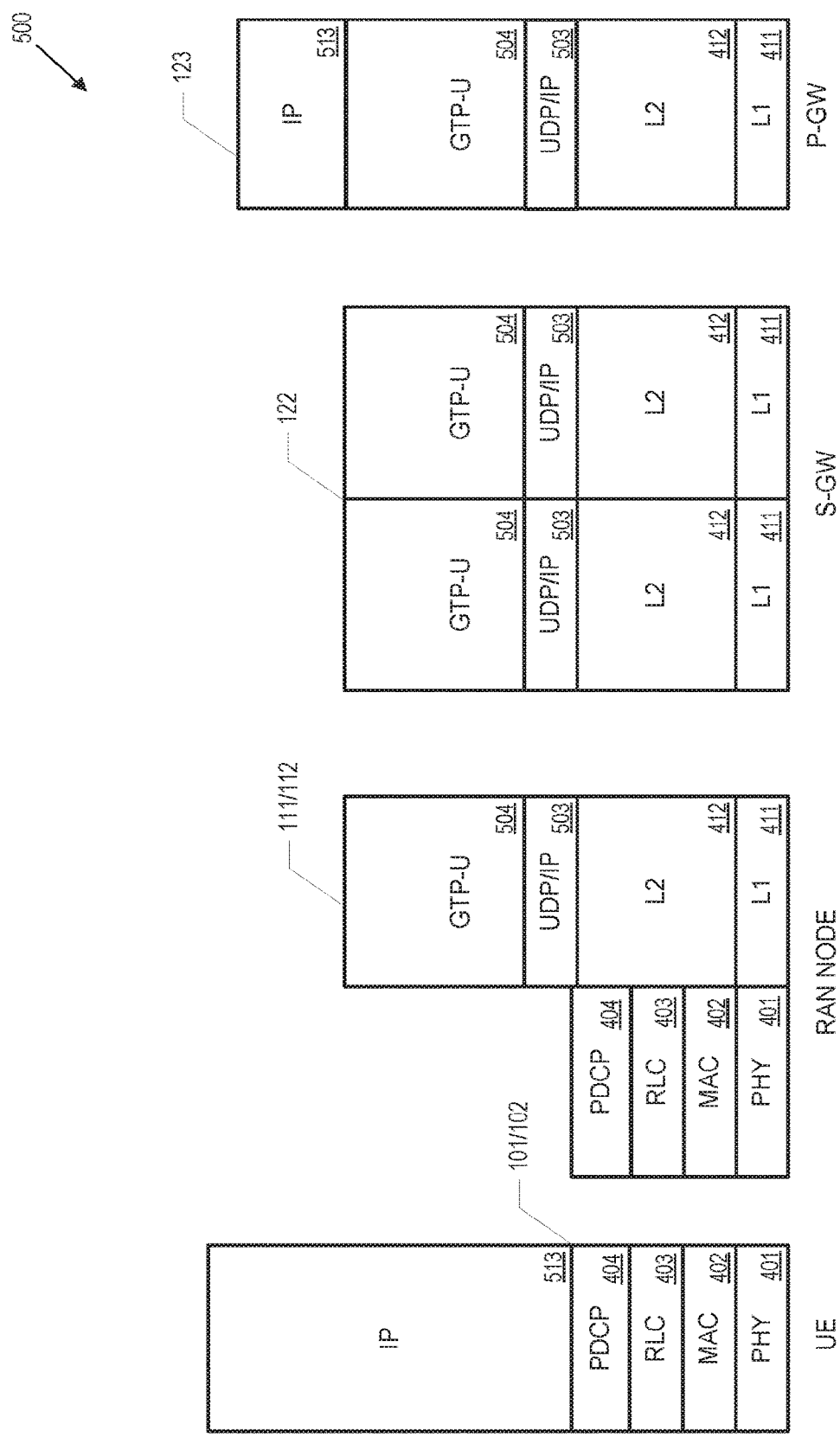
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, and the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the JDP/TP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
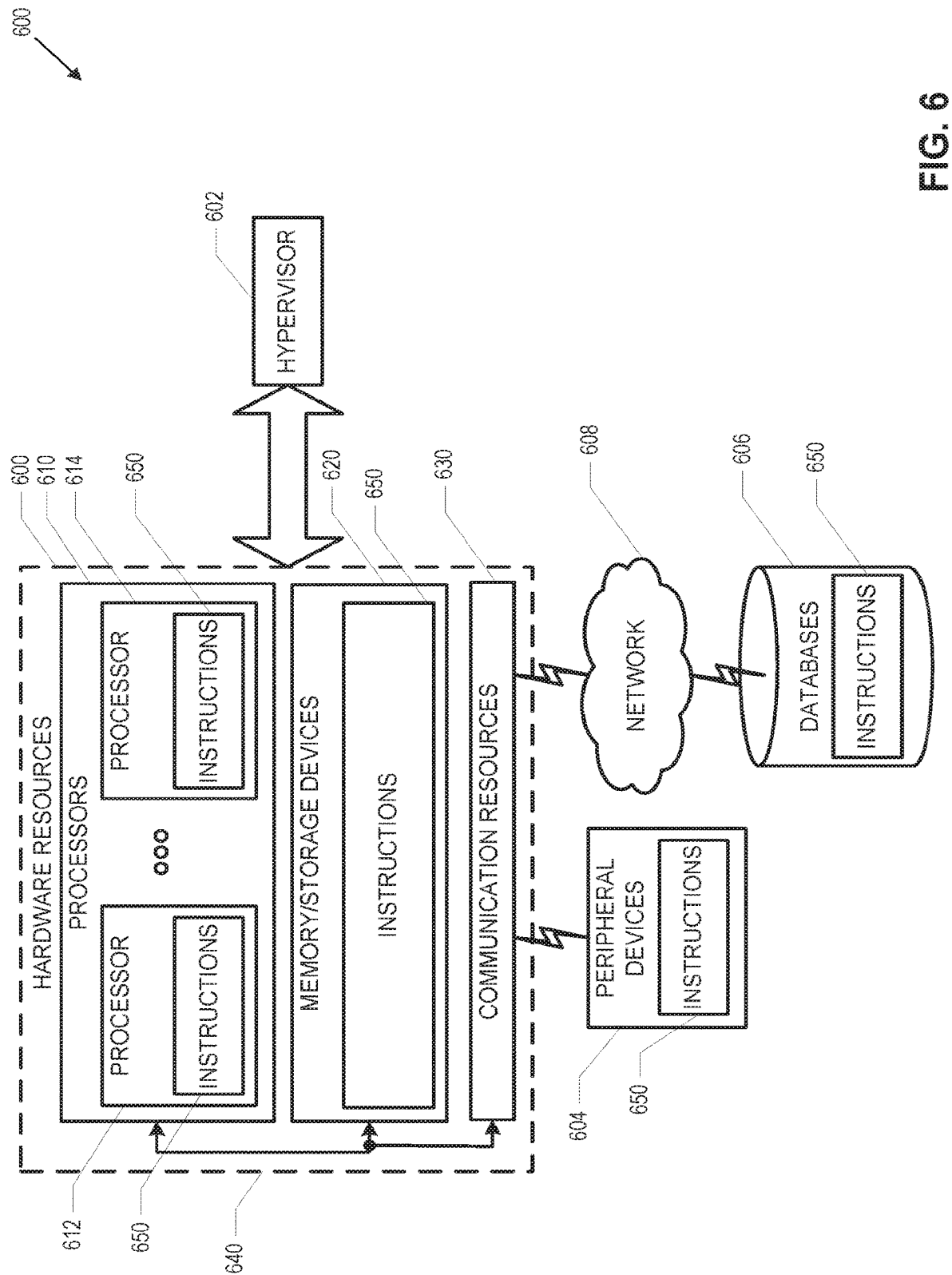
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects where node virtualization (e.g., NFV) is utilized, a hypervisor 602 may be executed to provide an execution environment for one or more network slices/sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM). Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

FIG. 7 illustrates examples of multiple beam transmissions in accordance with some aspects. Although the example scenarios 700 and 750 depicted in FIG. 7 may illustrate some aspects of techniques disclosed herein, it will be understood that embodiments are not limited by example scenarios 70 and 750. Embodiments are not limited to the number or type of components shown in FIG. 7 and are also not limited to the number or arrangement of transmitted beams shown in FIG. 7.

In example scenario 700, the eNB 104 may transmit a signal on multiple beams 705-720, any or all of which may be received at the UE 102. In some aspects, the multiple beams 705-720 can include synchronization signals and can form an SS burst set, which can be used by the UE 102 for discovery and measurement in connection with beamforming. It should be noted that the number of beams or transmission angles as shown are not limiting. As the beams 705-720 may be directional, transmitted energy from the beams 705-720 may be concentrated in the direction shown. Therefore, the UE 102 may not necessarily receive a significant amount of energy from beams 705 and 710 in some cases, due to the relative location of the U E 102.

UE 102 may receive a significant amount of energy from the beams 715 and 720 as shown. As an example, the beams 705-720 may be transmitted using different reference signals, and the UE 102 may determine channel-state information (CSI) feedback or other information for beams 715 and 720. In some aspects, each of beams 705-720 are configured as CSI reference signals (CSI-RS). In related embodiments, the CSI-RS signal is a part of the discovery reference signaling (DRS) configuration. The DRS configuration may serve to inform the UE 102 about the physical resources (e.g., subframes, subcarriers) on which the CSI-RS signal will be found. In related embodiments, the UE 102 is further informed about any scrambling sequences that are to be applied for CSI-RS. In some aspects, each of the beams 705-720 can be configured as synchronization signals, such as PSS/SSS or NRSS.

In some embodiments, up to 2 MIMO layers may be transmitted within each beam by using different polarizations. More than 2 MIMO layers may be transmitted by using multiple beams. In related embodiments, the UE is configured to discover the available beams and report those discovered beams to the eNB prior to the MIMO data transmissions using suitable reporting messaging. Based on the reporting messaging, the eNB 104 may determine suitable beam directions for the MIMO layers to be used for data communications with the UE 102. In various embodiments, there may be up to 2, 4, 8, 16, 32, or more MIMO layers, depending on the number of MIMO layers that are supported by the eNB 104 and UE 102. In a given scenario, the number of MIMO layers that may actually be used will depend on the quality of the signaling received at the UE 102, and the availability of reflected beams arriving at diverse angles at the UE 102 such that the UE 102 may discriminate the data carried on the separate beams.

In the example scenario 750, the UE 102 may determine angles or other information (such as CS feedback/report, including beam index, precoder, channel-quality indicator (CQI) or other) for the beams 765 and 770. The UE 102 may also determine such information when received at other angles, such as the illustrated beams 775 and 780. The beams 775 and 780 are demarcated using a dotted line configuration to indicate that they may not necessarily be transmitted at those angles, but that the UE 102 may determine the beam directions of beams 775 and 780 using such techniques as receive beam-forming, as receive directions. This situation may occur, for example, when a transmitted beam reflects from an object in the vicinity of the UE 102, and arrives at the UE 102 according to its reflected, rather than incident, angle.

As an example, the first signal received from the first eNB 104 may include a first directional beam based at least partly on a first reference signal and a second directional beam based at least partly on a second reference signal. The UE 102 may determine a rank indicator (RI) for the first reference signal and an RI for the second reference signal, and may transmit both RIs in the CSI messages. In an example, the reference signal (RS) can be a CSI-RS or a cell-specific reference signal (CRS). In addition, the UE 102 may determine one or more RIs for the second signal, and may also include them in the CSI messages in some cases. In some embodiments, the UE 102 may also determine a CQI, a precoding matrix indicator (PMI), receive angles or other information for one or both of the first and second signals. Such information may be included, along with one or more RIs, in the one or more CSI messages. In some embodiments, the UE 102 performs reference signal receive power (RSRP) measurement, received signal strength indication (RSSI) measurement, reference signal receive quality (RSRQ) measurement, signal-to-interference-plus-noise ratio (SINR), or some combination of these using reference signals.

Figure 8:
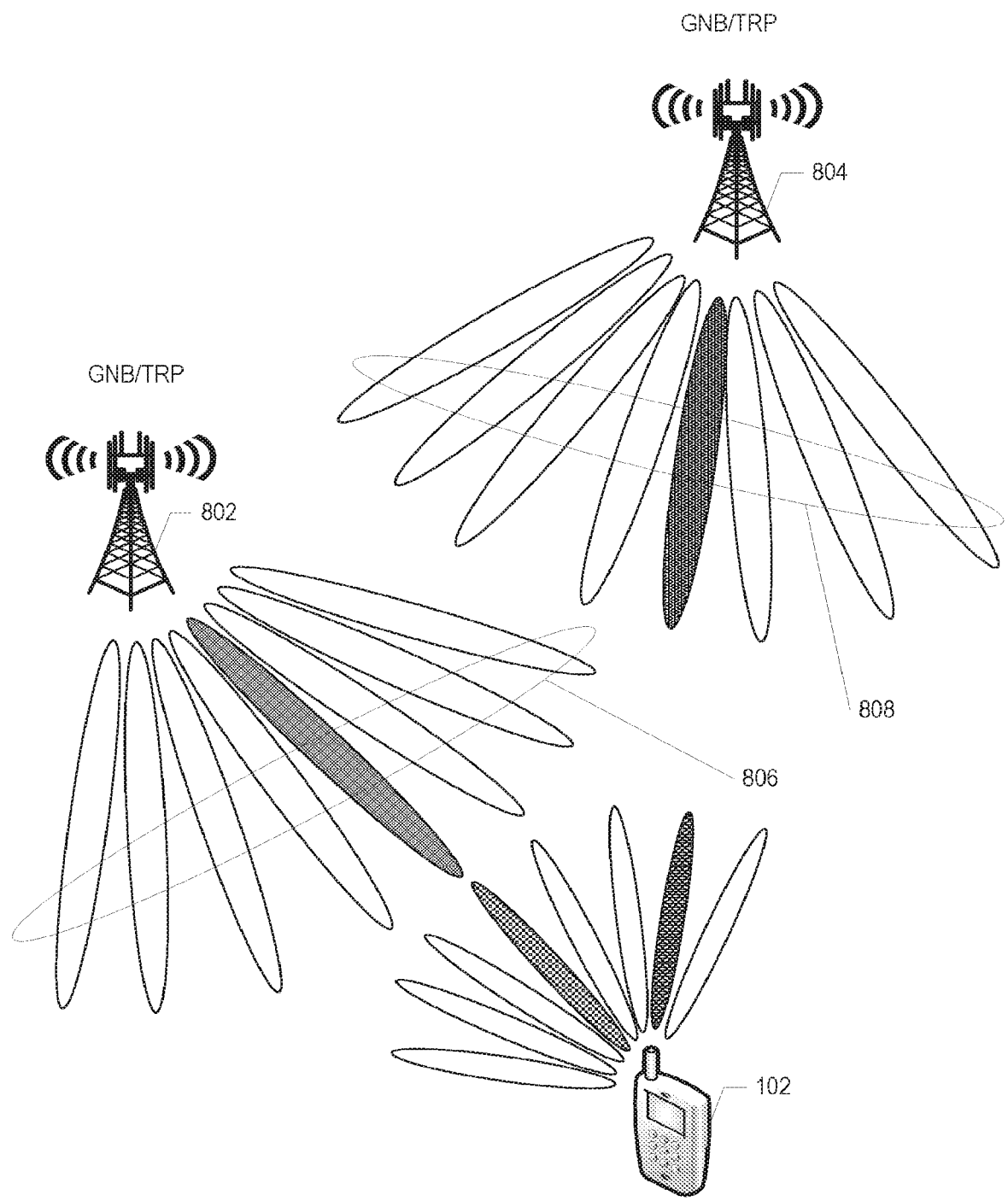
FIG. 8 illustrates a UE performing beamforming measurements in accordance with some aspects.

FIG. 8 illustrates a UE performing beamforming measurements in accordance with some aspects Referring to FIG. 8, there is illustrated a UE 102 communicating with GNB's 802 and 804. More specifically, GNB 802 can communicate an SS burst set 806 to the UE 102 for beamforming measurements. Similarly. GNB 804 can communicate an SS burst set to the UE 102 for beamforming measurements. In instances when multiple TRP's are associated with the cell of a GNB, the SS burst set communicated to the UE from within the cell can include synchronization signals from multiple TRP's associated with the same cell. For example, in instances when communication nodes 802 and 804 are TRP's associated with the same cell, the SS burst sets 806 and 808 can be communicated as a single SS burst set to the UE 102. As used herein, the term "SS burst set" can be used interchangeably with the term "SS block burst set."

Each of the SS burst sets 806 and 808 can include a plurality of synchronization signals (e.g., NRSS. PSS, and SSS), which can be used by the UE 102 for beamforming measurements. As used herein, each synchronization signal within an SS burst set can also be referred to as an SS block. For example, the UE 102 can measure the receive SS burst and sent back a cell beamforming measurement based on the entire received SS burst set, and/or it may send one or more individual beam measurements (e.g., measurements associated with the highlighted beams as seen in FIG. 8).

Figure 9:
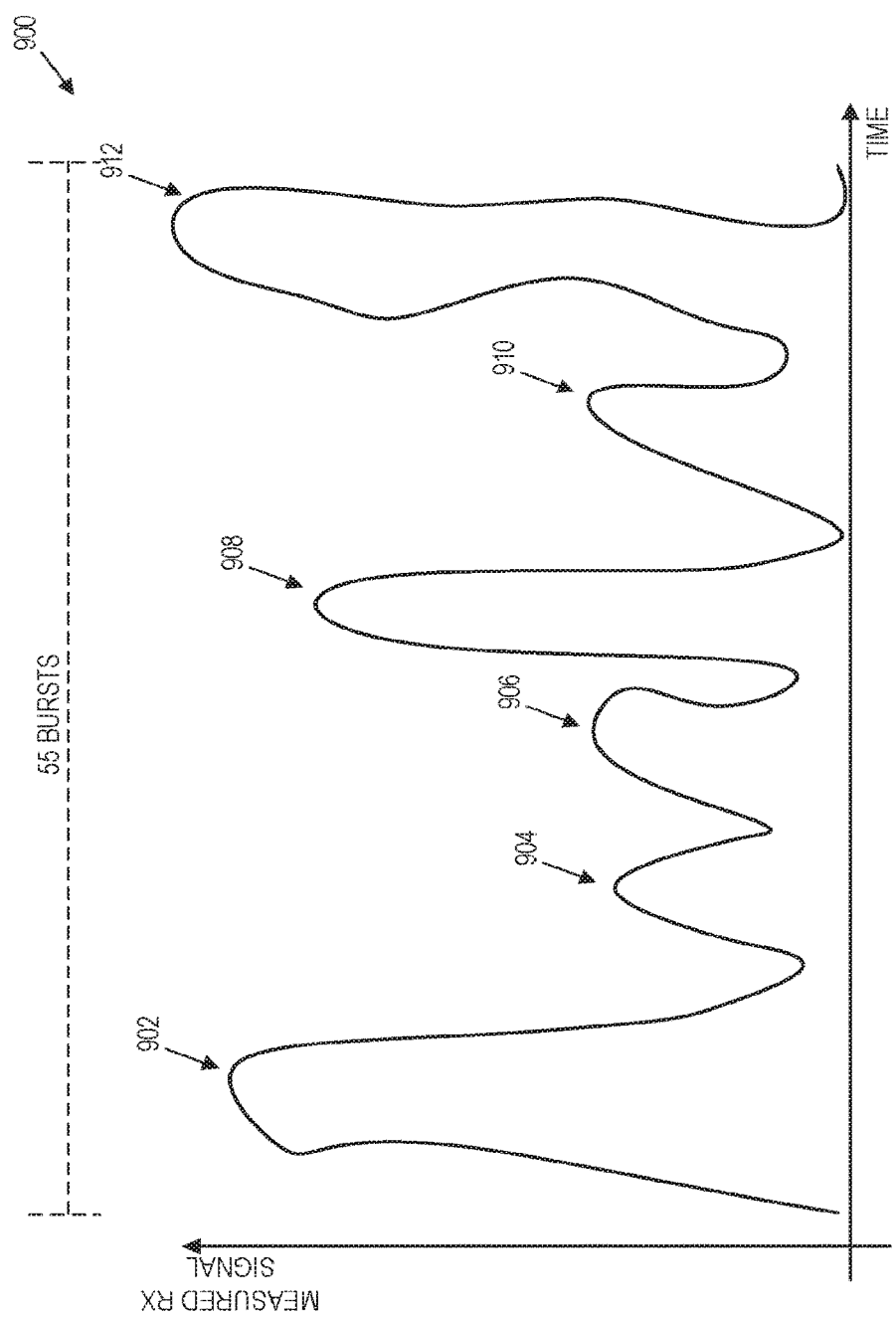
FIG. 9 illustrates SS burst set measurements at a first time T1 in accordance with some aspects.
Figure 10:
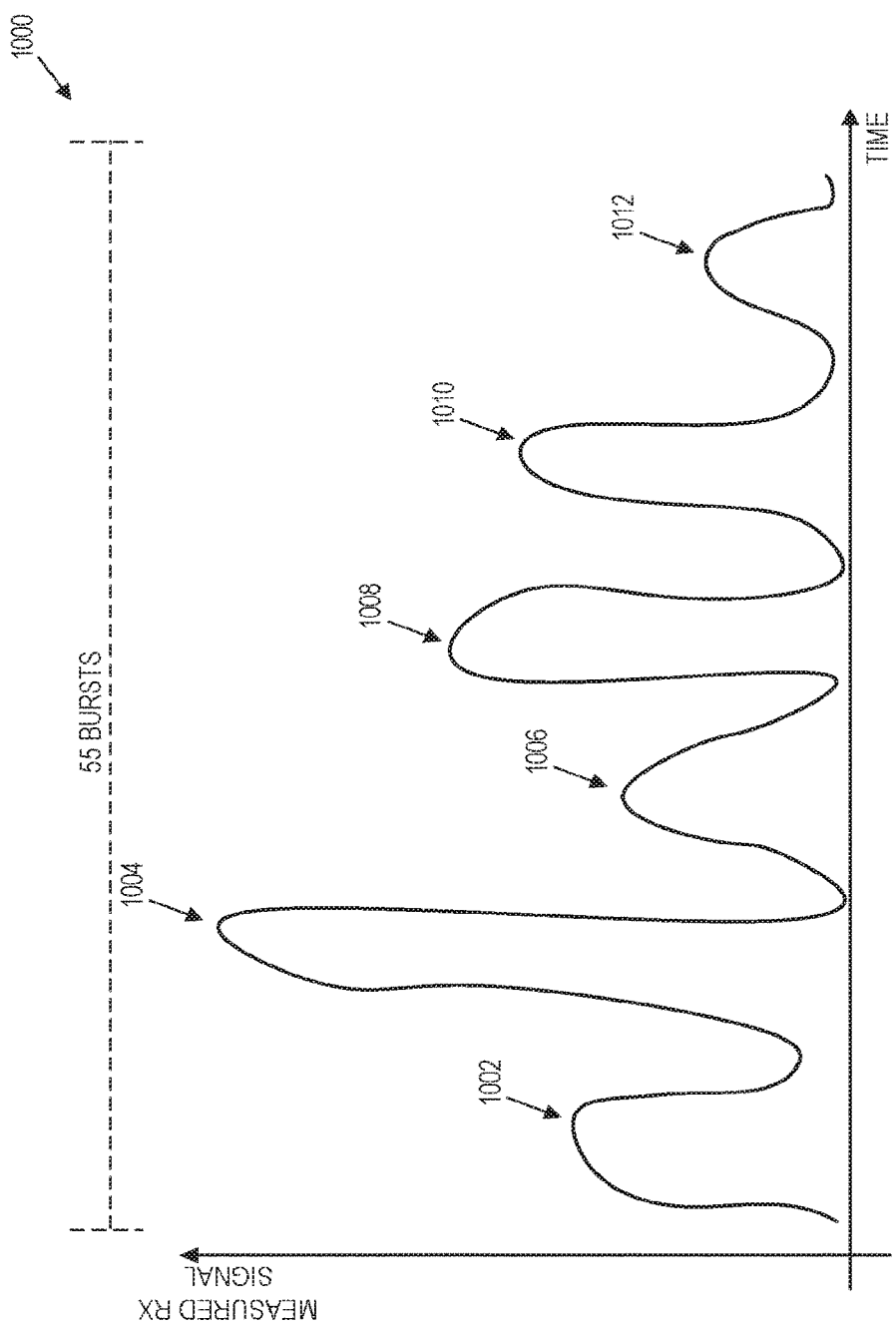
FIG. 10 illustrates SS burst set measurements at a second time T2 in accordance with some aspects.

FIG. 9 illustrates SS burst set measurements at a first time T1 in accordance with some aspects. FIG. 10 illustrates SS burst set measurements at a second time T2 in accordance with some aspects. Referring to FIG. 9, there is illustrated beamforming measurements for the SS burst set 900 at time T1. More specifically, the SS burst sets 900 can include a plurality of SS blocks (e.g., a plurality of bursts as indicated in FIG. 9), with visible peaks associated with SS blocks 902, 904, 906, 908, 910, and 912. Similarly, FIG. 10 illustrates beamforming measurements for the SS burst set 1000 at time T2. More specifically, the SS burst set 1000 can include a plurality of SS blocks, with visible peaks associated with SS blocks 1002, 1004, 1006, 1008, 1010, and 1012.

In some aspects, the SS block measurements within a received SS burst set can be performed periodically, using one or more of the following techniques. In some aspects, a maximum value of an SS block within an SS burst set can be reported as the cell beamforming measurement. For example, SS block 912 in SS burst set 900 has a maximum measured value (e.g., signal strength or another signal quality measurement), and the signal measurement for SS block 912 can be reported as the cell beamforming measurement associated with SS burst set 900.

In some aspects, an average measurement over the SS burst set duration can be reported as the cell beamforming measurement. For example and in reference to FIG. 10, an average measurement can be calculated using the measurements for SS blocks 1002-1012, and the average measurement can be reported as the cell beamforming measurement associated with SS burst set 1000.

In some aspects, a sum of the measurements of all detected SS blocks within an SS burst set can be reported as the cell beamforming measurement. For example and in reference to FIG. 9, individual measurements for each of the SS blocks 902-912 can be summed to generate a single summed measurement that can be reported back to the NodeB (e.g., a gNB) as the cell beamforming measurement. In some aspects, the average measurement or the summed measurement described to above can be normalized by a maximum value of the SS block measurements within an SS burst set.

In some aspects, an average measurement of individual SS block measurements that are above a threshold can be reported as the cell beamforming measurement. For example and in reference to FIG. 9, a threshold value can be set just above the signal measurement for SS block 910. In this regard, signal measurements for SS blocks 902, 908, and 912 will be above the threshold, and an average measurement can be calculated using only the signal measurements for SS blocks 902, 908, and 912. In some aspects, a summed measurement can be determined using the signal measurements that are above the threshold (i.e., a summed measurement based on the signal measurements for SS blocks 902, 908, and 912), and can be communicated as the cell beamforming measurement.

In some aspects, an average measurement or a summed measurement can be generated using signal measurements for top N peaks, where N is an integer greater than one. For example, for N=3, an average or a summed measurement can be generated using the signal measurement values associated with SS blocks 902, 908, and 912. In the above examples, the threshold value as well as the value of N can be communicated to the UE by the network (e.g. by the gNB) using higher layer signaling. In some aspects, any of the measurement values discussed herein above can be normalized by a number that is communicated by the network (e.g., a number of TRP's within the cell or another value selected by the network).

Even though communication of a cell beamforming measurement is discussed herein above, the disclosure is not limited in this regard. In some aspects, one or more individual beam measurements can also be determined using the SS burst set and then communicated back to the gNB for purposes of beamforming.

Figure 11:
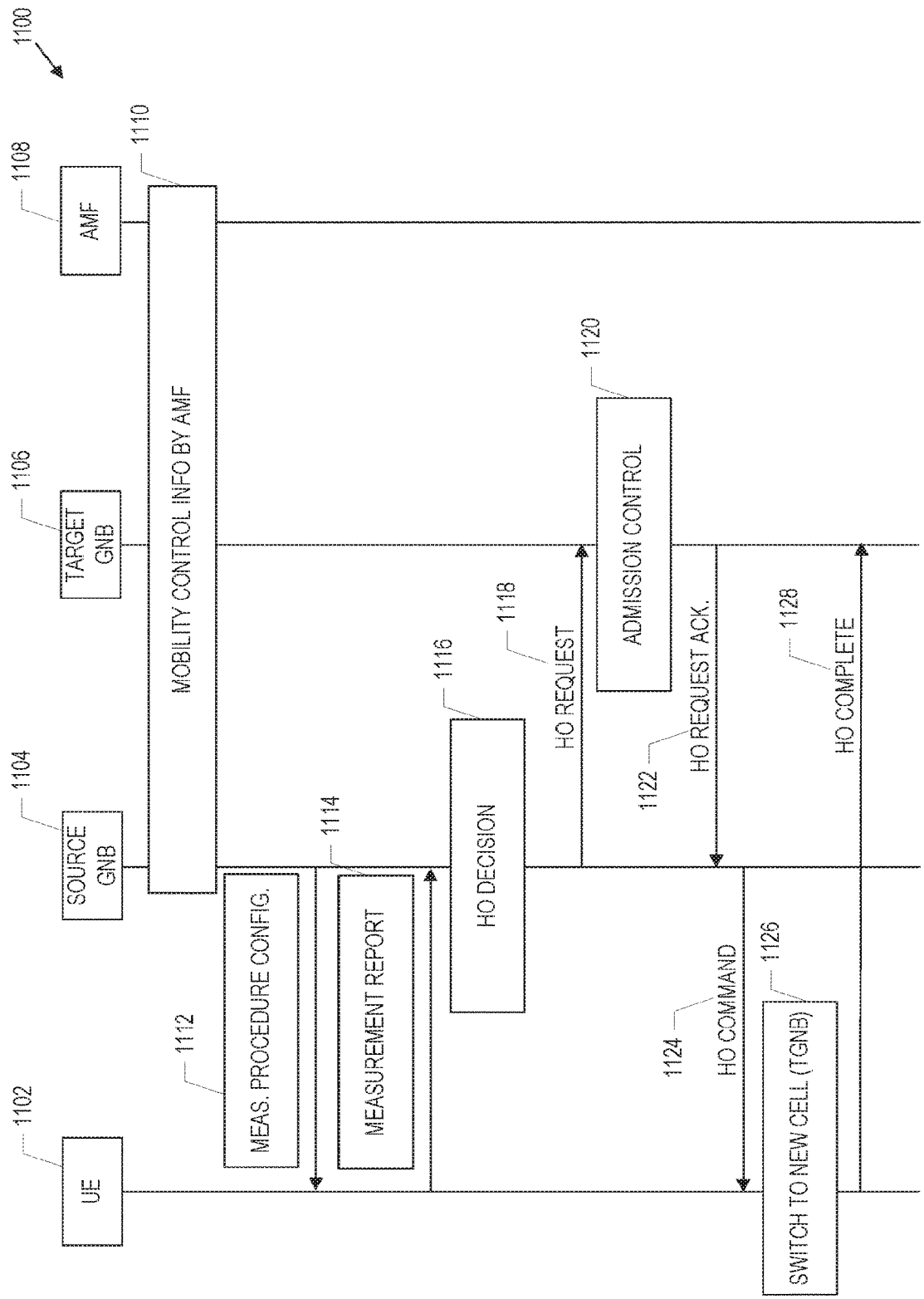
FIG. 11 illustrates an example communication sequence for performing a handover procedure in accordance with some aspects.

FIG. 11 illustrates an example communication sequence 1100 for performing a handover procedure in accordance with some aspects. Referring to FIG. 11, the example communication sequence 1100 Can Take PI, between a UE 1102, a source gNB 1104, a target gNB 1106, and a new generation core network entity such as AMF 1108. At 1110, mobility control information such as UE context is provided by the AMF 1108. The UE context within the source gNB 1104 can include information regarding roaming and access restrictions, and can be provided at connection establishment or during a timing advance update. At 1112, the source gNB 1104 can communicate measurement procedure configurations 1112 to the UE 1102, to configure the UE measurement procedures. For example and in reference to FIG. 12, the configurations 1112 can include radio resource control (RRC) configuration parameters used during beam selection, beam consolidation, filtering, and so forth, as indicated in FIG. 12.

At 1114, the UE 1102 can communicate a measurement report to the source gNB 1104. In some aspects, the measurement report 1114 can include one or more measurements for beamforming, such as a cell beamforming measurement and/or one or more individual beam measurements based on an SS burst set received at the UE 1102. The measurement report can further include radio resource management information. At 1116, the source gNB 1104 can make a decision to handover the UE to the target gNB 1106. At 1118, the source gNB 1104 can communicate a handover request to the target gNB 1106, to initiate the handover. At 1120, the target gNB 1106 can perform admission control and can provide radio resource control (RRC) configuration as part of the handover request acknowledgment at 1122. In some aspects, the handover request acknowledgment at 1122 can include a transparent container to be sent to the UE as an RRC message in order to perform the handover. At 1124, the source gNB 1104 can provide the RRC configuration to the UE 1102 in the handover command. In some aspects, the handover command message can include cell ID information as well as additional information that can be used by the UE to access the target gNB 1106 without reading system information. In some aspects, the handover command message can further include information that can be used for contention-based and contention-free random access. At 1126, the UE 1102 can move the RRC connection and switch to the new cell associated with the target gNB 1106. At 1128, a handover complete message can be communicated to the target gNB 1106.

Figure 12:
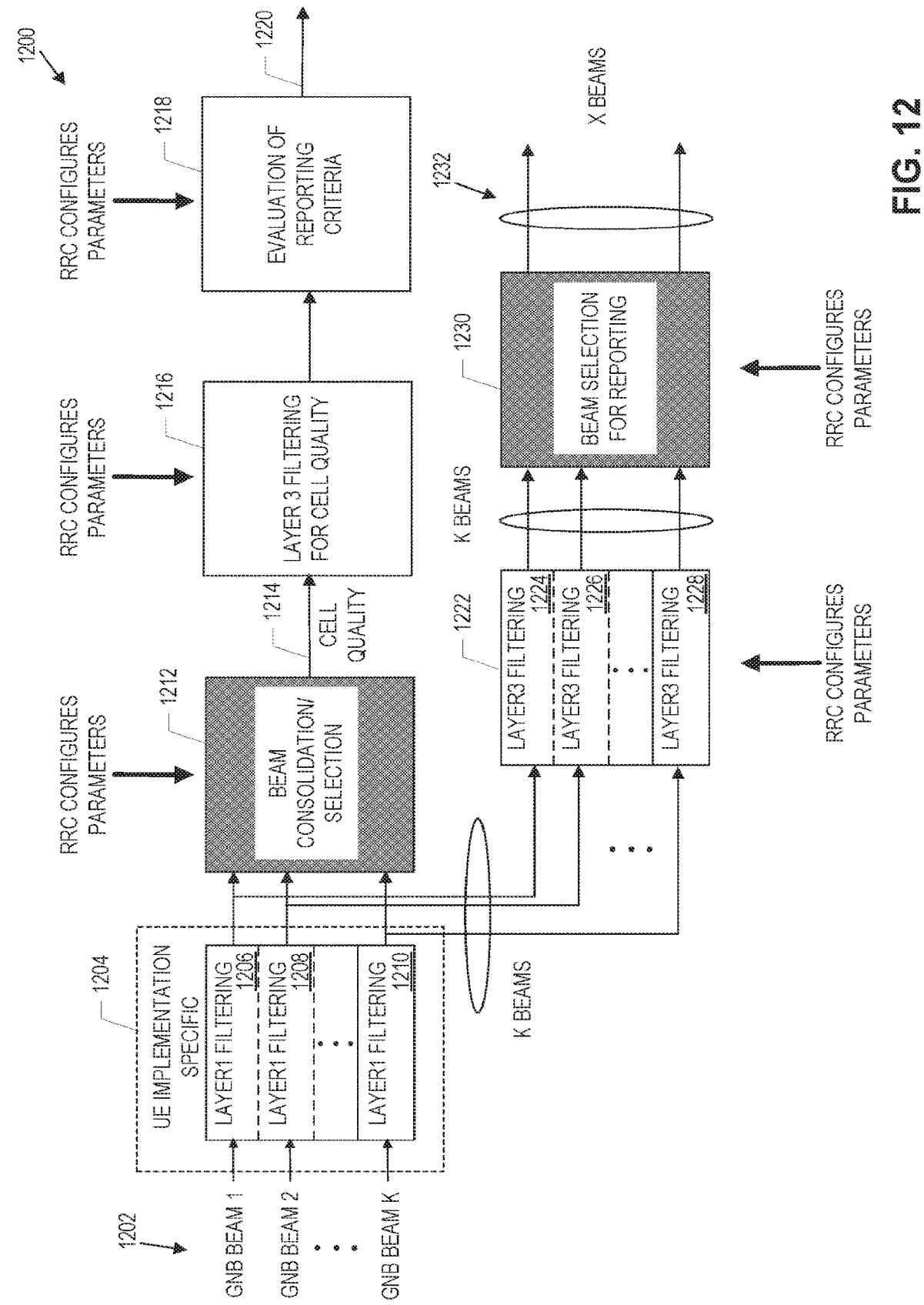
FIG. 12 illustrates example filtering circuitry which can be used by a UE to filter SS blocks received within a SS burst set in accordance with some aspects.

FIG. 12 illustrates example filtering circuitry which can be used by a UE to filter SS blocks received within a SS burst set in accordance with some aspects. Referring to FIG. 12, the filtering circuitry 1200 can be implemented within the UE (e.g., 102) and can be configured to perform signal measurement filtering, such as filtering of a cell beamforming measurement signal as well as individual beam measurements, prior to communication of such measurements to the source gNB and/or another network entity.

The filtering circuitry 1200 can include a layer 1 (L1) filtering circuitry 1204, layer 3 (L3) filtering circuitry 1216 and 1222, consolidation circuitry 1212, evaluation circuitry 1218, and beam selection circuitry 1230.

In operation, the UE can receive an SS burst set an individual signal measurements 1202 of beams within the SS burst set can be communicated to the filtering circuitry 1204. In some aspects, the filtering circuitry 1204 can include individual L1 filters 1206-1210, and each of the L1 filters can be configured to receive and filter a corresponding beam signal measurement 1202 from the received SS burst set. For purposes of generating a single cell beamforming measurement signal, the filtered signal measurements at the output of filtering circuitry 1204 can be communicated to the beam consolidation and selection circuitry 1212, which can be configured to consolidate the received measurements and generate a single beamforming measurement 1214. The single measurement 1214 is received at the L3 filtering circuitry 1216, which can be configured to perform L3 filtering. The filtered single measurement signal output from the L3 filtering circuitry 1216 is received by the evaluation circuitry 1218. The evaluation circuitry 1218 evaluates the single measurement in connection with one or more evaluation criteria to determine whether to output the single measurement. Upon successful evaluation by the evaluation circuitry 1218, a single cell beamforming measurement 1220 is output.

In instances when individual beam measurement reporting is configured to, the L1 filtered measurement signals output by the L1 filtering circuitry 1204 are communicated to L3 filtering circuit 1222. More specifically, each of the L1 filtered signal measurements is received by a corresponding L3 filter 1224-1228 within the L3 filtering circuitry 1222. L3 filtered be measurement signals are then communicated to the beam selection circuitry 1230. The beam selection circuitry 1230 can apply one or more selection criteria and select individual beam measurement signals 1232 four output.

In some aspects and in connection with one of the options described herein above for generating a cell beamforming measurement, L1 filtering can be applied to individual beam measurements and L3 filtering can be applied on a single cell level measurement, as described in reference to generating the single cell level beamforming measurement 1220 in FIG. 12.

In some aspects and in connection with one or more of the options described herein above for generating a cell beamforming measurement, signal measurement peaks for signal measurements within an SS burst set can be sorted (e.g., in a descending order), and L1/L3 filtering can be applied to the order of the sorted beams. For example, if top N peaks of the individual signal measurements within a received SS burst set are configured, then the L1/L3 filtering can apply to the highest peak, the second highest peak, and so forth along the SS burst set. In some aspects, the individual signal measurements within a received SS burst set can be left unsorted and corresponding L1/L3 filters can be applied to the individual signal measurements in the order the signals are received. i.e., signal measurements are processed based on signal time index.

Figure 13:
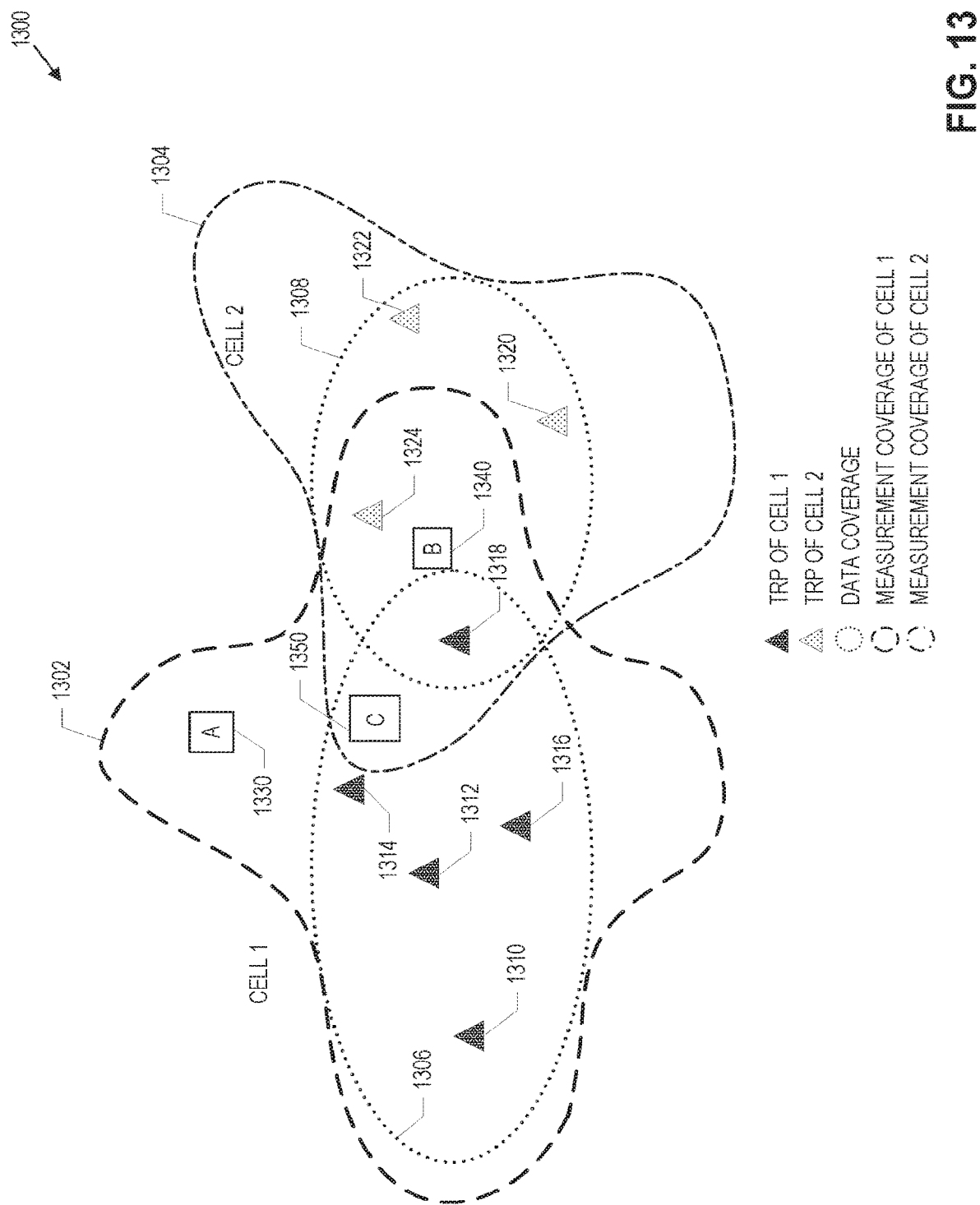
FIG. 13 illustrates various example scenarios with different measurement and data coverage associated with a cell in accordance with some aspects.

FIG. 13 illustrates various example scenarios with different measurement and data coverage associated with a cell in accordance with some aspects. Referring to FIG. 13, the communication environment 1300 can include multiple cells with multiple TRP's associated with each cell. For example, a first cell 1302 can include TRP's 1310, 1312, 1314, 1316, and 1318. A second cell 1304 can include TRP's 1320, 1322, and 1324. A UE, which is indicated as A, B or C in FIG. 13, can be at different locations within cell 1302 or cell 1304.

In some aspects, the TRP's within each cell can form beams in measurement at the UE. In this regard, the UE will receive the sum of the multiple beams signals but it may not identify that the received beam signals (e.g., within an SS burst set) originates from multiple TRP's within a cell. The following data coverage challenges may be addressed:

In instances when the UE is at position 1330 within cell 1302, the UE can perform cell beamforming measurements using synchronization signals received from TRP's 1310-1318. However, when the data channel is formed to the UE at location 1330, there may be no coverage as data coverage 1306 four cell 1302 is outside of the UE position 1330.

In instances when the UE is at position 1340 covered by both cells 1302 and 1304, the UE may have no coverage in data for cell 1302 (since it is outside of the data coverage area 1306 for cell 1302) but may obtain measurements associated with synchronization signals received from TRP's within cell 1302. Beamforming measurements can also be formed for cell 1304 based on synchronization signals received from TRP's 1320-1324 associated with cell 1304. The beamforming measurements can be stronger in cell 1302 or 1304. In instances one beamforming measurements are stronger in cell 1302, the UE may experience no data coverage in cell 1302 (since the UE is outside of the data coverage area 1306) and may need to handover to cell 1304.

In instances when the UE is at position 1350, the beamforming measurements may indicate that the UE should reselect or handover to cell 1304. However, since the UE is outside of the data coverage area 1308 associated with cell 1304, the UE may need to handover back to cell 1302.

To address the above potential measurement and data coverage and imbalance issues, in some aspects, the network may allocate additional signaling (e.g., channel state information reference signal (CSI-RS) measurement) after the UE has communicated the RRM measurement (i.e. the cell beamforming measurement) based on the SS burst set. The additional signaling allocated by the network can include data coverage information associated with the source and/or target cells. In this case, the UE can use the additional information communicated by the network, which includes the real data coverage of the potential target cell, in order to determine handover.

In some aspects, fallback mode can be enabled at the UE so that when the UE reselects or performs handover to the target gNB, the UE does not remove all of the source gNB configuration until it is sure it can camp successfully at the target gNB. In instances when the UE cannot successfully reselect the target gNB or perform a handover to the target gNB, the UE can go back and connect to the source gNB Additional signaling may be used by the UE to indicate to the source or target gNB when handover is completed. In instances when handover is not completed, the UE may indicate to the source gNB and fast fallback can take place based on the retained source gNB configuration information.

In some aspects, serving cell radio link monitoring (RLM) may be different from radio resource management (RRM) associated with generating beamforming measurements, the following options to perform serving cell RRM can be used. Radio link monitoring can be used by the UE to ensure the UE has good connection with the serving cell. In instances when the connection is poor, the UE can start a radio link failure (RLF) timer, and when the RLF timer expires, the UE can declare a radio link failure. In one aspect, the UE can use the current serving cell beam measurement as RRM. In this case, the comparison with a neighboring cell RRM will use one of the above options for determining a beamforming measurement, and such measurement can be different from the serving cell measurement. Put another way, the UE can use the same method to measure serving cell as used in RLM.

In another aspect, serving cell RRM can be the same as a neighboring cell RRM. In this case, RLM (and therefore RLF) procedure may be different from the RRM cell beamforming measurement. Put another way, the UE can use the same RRM procedure is used for the neighboring cell, which will be different from the RLM measurements.

Figure 14:
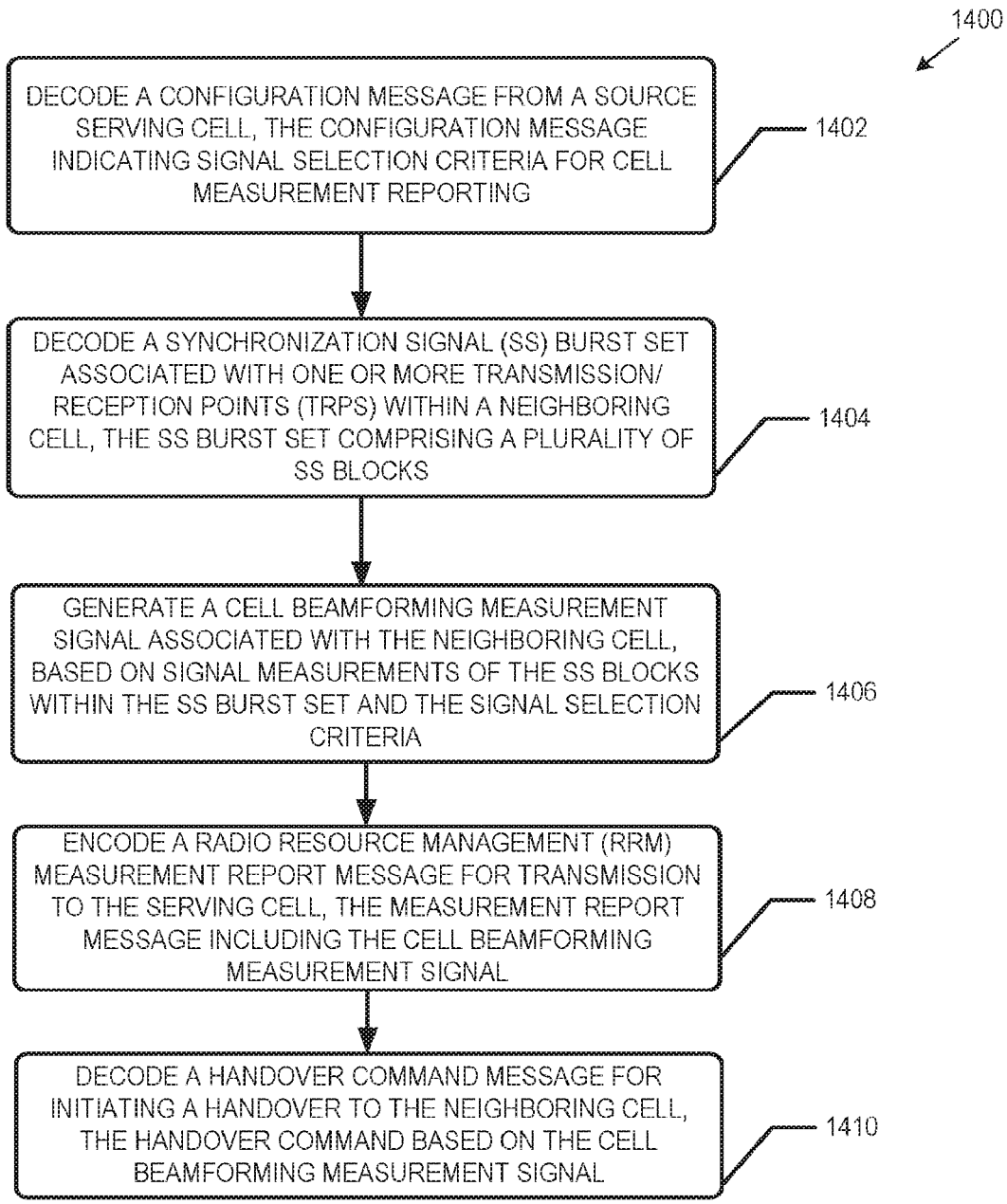
FIG. 14 is a flow diagram illustrating example functionalities for performing beamforming measurements in accordance with some aspects.

FIG. 14 is a flow diagram illustrating example functionalities for performing beamforming measurements in accordance with some aspects. Referring to FIG. 14, the example method 1400 can start at 1402, when a configuration message from a source serving cell can be decoded. For example, source gNB 1104 can communicate the configuration message 1112 to the UE 1102, where the configuration message 1112 can be configured to indicate signal selection criteria for cell measurement reporting.

At 1404, a synchronization signal (SS) burst set associated with one or more transmission/reception points (TRPs) within a neighboring cell can be decoded, where the SS burst set can include a plurality of SS blocks. For example, UE 102 can receive the SS burst set 806, which includes a plurality of synchronization signals (or SS blocks). At 1406, a cell beamforming measurement signal associated with the neighboring cell can be generated, based on signal measurements of the SS blocks within the SS burst set and the signal selection criteria. For example, the selection criteria can include one or more of the configuration parameters used by the filtering circuitry 1200 (e.g., configuration parameters or criteria used for beam consolidation, beam selection, L1/L3 filtering, cell beamforming measurement reporting criteria, and so forth). A cell beamforming measurement signal can be generated using one or more of the techniques described herein above. At 1408, a radio resource management (RRM) measurement report message can be encoded for transmission to the serving cell. The measurement report message (e.g. the report communicated at 1114 in FIG. 1) can be configured to include the cell beamforming measurement signal. At 1410, a handover command message for initiating a handover to the neighboring cell can be decoded. The handover command (e.g., the handover command received at 1124 in FIG. 11) can be based on the cell beamforming measurement signal.

Figure 15:
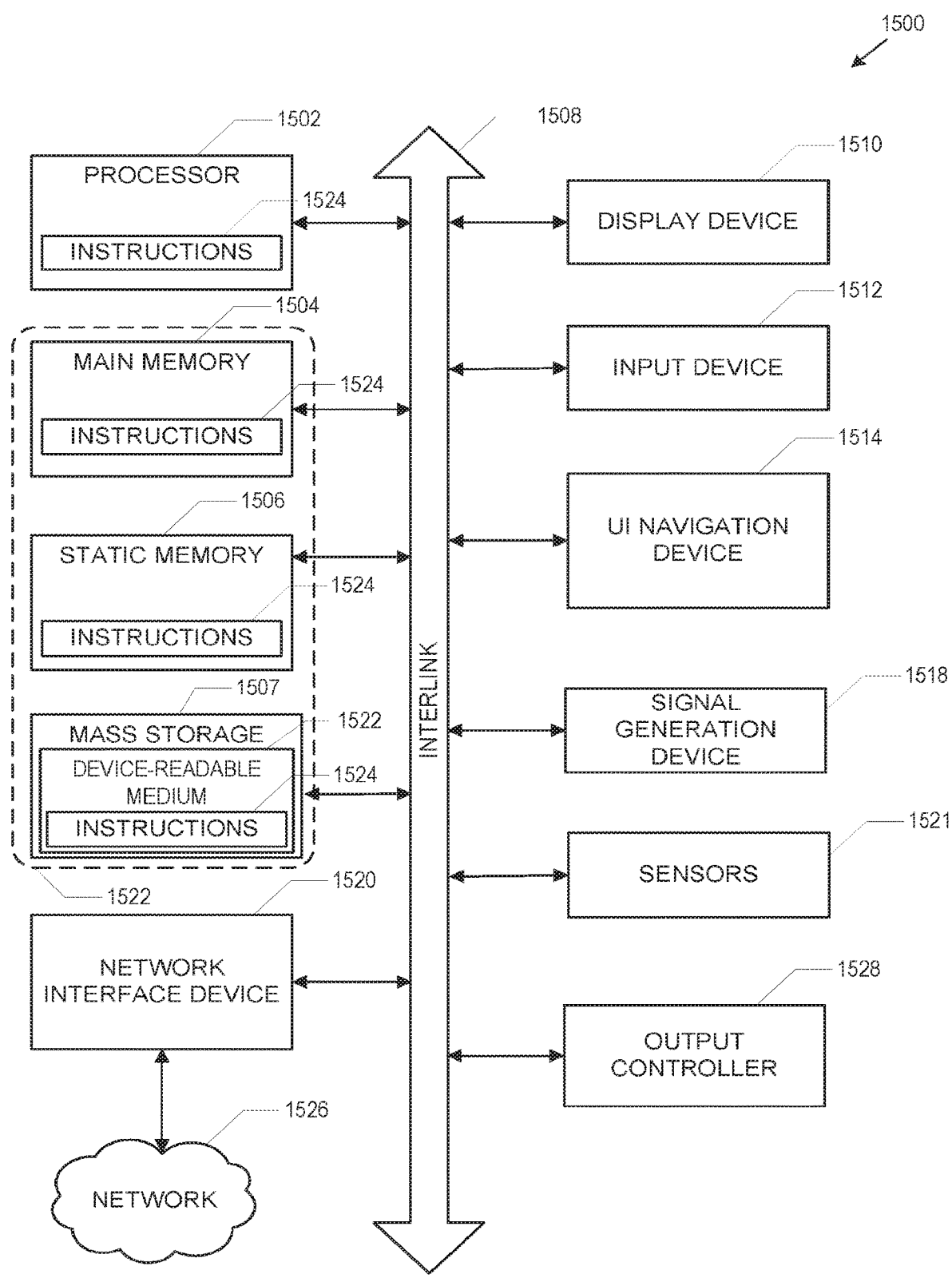
FIG. 15 illustrates a block diagram of a communication device such as an evolved Node-B (eNB), a new generation Node-B (gNB), an access point (AP), a wireless station (STA), or a user equipment (UE), in accordance with some aspects.

FIG. 15 illustrates a block diagram of a communication device such as an evolved Node-B (eNB), a new generation Node-B (gNB), an access point (AP), a wireless station (STA), or a user equipment (UE), in accordance with some aspects. In alternative aspects, the communication device 1500 may operate as a standalone device or may be connected (e.g., networked) to other communication devices.

Circuitry (e.g., processing circuitry) is a collection of circuits implemented in tangible entities of the device 1500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1500 follow.

In some aspects, the device 1500 may operate as a standalone device or may be connected (e.g., networked) to other devices. In a networked deployment, the communication device 1500 may operate in the capacity of a server communication device, a client communication device, or both in server-client network environments. In an example, the communication device 1500 may act as a peer communication device in peer-to-peer (P2P)(or other distributed) network environment. The communication device 1500 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1500 may include a hardware processor 1502 (e.g., a central processing unit (CPU), a graphics processing unit (GPU), a hardware processor core, or any combination thereof), a main memory 1504, a static memory 1506, and mass storage 1516 (e.g., hard drive, tape drive, flash storage, or other block or storage devices), some or all of which may communicate with each other via an interlink (e.g., bus) 1508.

The communication device 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The communication device 150 may additionally include a signal generation device 1518 (e.g., a speaker), a network interface device 1520, and one or more sensors 1521, such as a global positioning system (GPS) sensor, compass, accelerometer, or other sensor. The communication device 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1516 may include a communication device-readable medium 1522, on which is stored one or more sets of data structures or instructions 1524 (e.g., software) embodying or utilized by any one or more of the techniques or functions described herein. In some aspects, registers of the processor 1502, the main memory 1504, the static memory 1506, and/or the mass storage 1516 may be, or include (completely or at least partially), the device-readable medium 1522, on which is stored the one or more sets of data structures or instructions 1524, embodying or utilized by any one or more of the techniques or functions described herein. In an example, one or any combination of the hardware processor 1502, the main memory 1504, the static memory 1506, or the mass storage 1516 may constitute the device-readable medium 1522.

As used herein, the term "device-readable medium" is interchangeable with "computer-readable medium" or "machine-readable medium". While the communication device-readable medium 1522 is illustrated as a single medium, the term "communication device-readable medium" may include a single medium or multiple media (e.g., a centralized or distributed database, and/or associated caches and servers) configured to store the one or more instructions 1524.

The term "communication device-readable medium" may include any medium that is capable of storing, encoding, or carrying instructions for execution by the communication device 1500 and that cause the communication device 1500 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks. Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), MIMO, or multiple-input single-output (MISO) techniques. In some examples, the network interface device 1520 may wirelessly communicate using Multiple User MIMO techniques.

The term "transmission medium" shall be taken to include any intangible medium that is capable of storing, encoding or carrying instructions for execution by the communication device 1500, and includes digital or analog communications signals or other intangible medium to facilitate communication of such software. In this regard, a transmission medium in the context of this disclosure is a device-readable medium.

ADDITIONAL NOTES AND EXAMPLES

Example 1 is an apparatus of a user equipment (UE), the apparatus comprising: processing circuitry, the processing circuitry configured to: decode a configuration message from a source serving cell, the configuration message indicating signal selection criteria for cell measurement reporting: decode a synchronization signal (SS) burst set associated with one or more transmission/reception points (TRPs) within a neighboring cell, the SS burst set comprising a plurality of SS blocks; generate a cell beamforming measurement signal associated with the neighboring cell, based on signal measurements of the SS blocks within the SS burst set and the signal selection criteria; encode a radio resource management (RRM) measurement report message for transmission to the serving cell, the measurement report message including the cell beamforming measurement signal: and decode a handover command message for initiating a handover to the neighboring cell, the handover command responsive to the cell beamforming measurement signal; and memory coupled to the processing circuitry, the memory configured to store the signal selection criteria.

In Example 2, the subject matter of Example 1 includes, wherein the cell beamforming measurement signal is indicative of signal strength of the SS blocks originating from the neighboring cell, and wherein each of the SS blocks comprise a new radio synchronization signal (N RSS).

In Example 3, the subject matter of Examples 1-2 includes, wherein the processing circuitry is further configured to: decode a second SS burst set associated with one or more TRPs within the source serving cell; and generate a second cell beamforming measurement signal for transmission to the source serving cell, based on signal measurements of SS blocks within the second SS burst set and the signal selection criteria, the handover command message further based on the second cell beamforming measurement signal.

In Example 4, the subject matter of Examples 1-3 includes, wherein the processing circuitry is further configured to: perform measurement on one of the plurality of SS blocks associated with a maximum signal strength among the plurality of SS blocks to generate the cell beamforming measurement signal.

In Example 5, the subject matter of Examples 1-4 includes, wherein the processing circuitry is further configured to: generate an average SS block using the plurality of SS blocks: perform measurement on the average SS block to generate the cell beamforming measurement signal; and normalize the average SS block using one of the plurality of SS blocks associated with a maximum signal strength.

In Example 6, the subject matter of Examples 1-5 includes, wherein the processing circuitry is further configured to: generate a summed SS block using the plurality of SS blocks; perform measurement on the summed SS block to generate the cell beamforming measurement signal, and normalize the sunned SS block using one of the plurality of SS blocks associated with a maximum signal strength.

In Example 7, the subject matter of Examples 1-6 includes, wherein the processing circuitry is further configured to: generate a summed SS block using a subset of the plurality of SS blocks associated with a signal strength above a threshold; and perform measurement on the summed SS block to generate the cell beamforming measurement signal.

In Example 8, the subject matter of Examples 1-7 includes, wherein the processing circuitry is further configured to: generate a summed SS block using a subset of the plurality of SS blocks associated with a signal strength above a threshold; and perform measurement on the summed SS block to generate the cell beamforming measurement signal.

In Example 9, the subject matter of Examples 1-8 includes, wherein the processing circuitry is further configured to: generate a summed SS block using a subset of the plurality of SS blocks, wherein the subset of the SS blocks represent top N synchronization signals with a highest signal strength within the SS burst set, wherein N is an integer greater than 1: and perform measurement on the summed SS block to generate the cell beamforming measurement signal.

In Example 10, the subject matter of Examples 1-9 includes, wherein the processing circuitry is further configured to: generate an average SS block over a subset of the plurality of SS blocks, wherein the subset of the SS blocks represent top N synchronization signals with a highest signal strength within the SS burst set, wherein N is an integer greater than 1: and perform measurement on the average SS block to generate the cell beamforming measurement signal.

In Example 11, the subject matter of Examples 1-10 includes, wherein the processing circuitry is further configured to: decode higher layer signaling including a normalization value; and normalize the cell beamforming measurement signal using the normalization value, prior to encoding the RRM measurement report.

In Example 12, the subject matter of Examples 1-11 includes, wherein the processing circuitry is further configured to: apply layer 1 (L1) filtering on each of the SS blocks: generate the cell beamforming measurement signal based on the filtered SS blocks; and apply layer 3 (L3) filtering to the cell beamforming measurement signal to generate a filtered cell beamforming measurement signal for encoding into the RRM measurement report based on the signal selection criteria.

In Example 13, the subject matter of Examples 1-12 includes, wherein the processing circuitry is further configured to: sort the SS blocks within the SS burst set based on signal strength; apply layer 1 (L1) filtering to a top N number of the sorted SS blocks to generate filtered SS blocks, wherein N is an integer greater than 1 and N is configured by higher layer signaling; and generate the cell beamforming measurement signal based on the filtered SS blocks.

In Example 14, the subject matter of Examples 1-13 includes, wherein the processing circuitry is further configured to: apply layer 1 (L1) filtering to the SS blocks according to a receive time index, to generate filtered SS blocks; and generate the cell beamforming measurement signal based on the filtered SS blocks.

In Example 15, the subject matter of Examples 1-14 includes, wherein the processing circuitry is further configured to: store configuration information associated with the source serving cell within the memory; and upon detecting a failure of the handover to the neighboring cell, initiate a fallback procedure for initiating a connection to the source serving cell based on the stored configuration information.

In Example 16, the subject matter of Examples 1-15 includes, wherein the SS burst set is a radio link monitoring (RLM) burst set, received during an RLM procedure.

In Example 17, the subject matter of Examples 1-16 includes, transceiver circuitry coupled to the processing circuitry; and, one or more antennas coupled to the transceiver circuitry.

Example 18 is a non-transitory computer-readable storage medium that stores instructions for execution by one or more processors of a user equipment (UE), the instructions to configure the one or more processors to cause the UE to: decode a synchronization signal (SS) burst set originating from one or more transmission/reception points (TRPs) within a neighboring cell, the SS burst set comprising a plurality of new radio synchronization signals (NRSSs) received within a serving cell; decode a UE-specific reference signal, the reference signal indicative of data coverage within the neighboring cell; generate a cell beamforming measurement signal associated with the neighboring cell, based on signal measurements of the NRSSs within the SS burst set, the cell beamforming measurement signal for transmission to the serving cell; decode a handover command message for initiating a handover to the neighboring cell, the handover command responsive to the cell beamforming measurement signal; and determine to initiate a handover procedure from the serving cell to the neighboring cell based on the handover command and the data coverage within the neighboring cell.

In Example 19, the subject matter of Example 18 includes, wherein the UE-specific reference signal is a channel state information reference signal (CSI-RS).

In Example 20, the subject matter of Examples 18-19 includes, wherein the one or more processors further cause the UE to: encode a radio resource management (RRM) measurement report message for transmission to the serving cell, the measurement report message including the cell beamforming measurement signal.

In Example 21, the subject matter of Examples 18-20 includes, wherein the one or more processors further cause the UE to: decode a second SS burst set associated with one or more TRPs within the source serving cell; and generate a second cell beamforming measurement signal for transmission to the source serving cell, based on signal measurements of NRSSs within the second SS burst set, the handover command message further based on the second cell beamforming measurement signal.

In Example 22, the subject matter of Examples 18-21 includes, wherein the one or more processors further cause the UE to: generate a summed NRSS using a subset of the plurality of NRSSs associated with a signal strength above a threshold; and perform measurement on the summed NRSS to generate the cell beamforming measurement signal.

In Example 23, the subject matter of Examples 18-22 includes, wherein the one or more processors further cause the UE to: generate a summed NRSS using a subset of the plurality of NRSSs, wherein the subset of the NRSSs represent top N synchronization signals with a highest signal strength within the SS burst set, wherein N is an integer greater than 1; and perform measurement on the summed NRSS to generate the cell beamforming measurement signal.

In Example 24, the subject matter of Examples 18-23 includes, wherein the one or more processors further cause the UE to: generate an average NRSS over a subset of the plurality of NRSSs, wherein the subset of the NRSSs represent top N synchronization signals with a highest signal strength within the SS burst set, wherein N is an integer greater than 1; and perform measurement on the average NRSS to generate the cell beamforming measurement signal.

Example 25 is an apparatus of a Node-B (NB), the apparatus comprising: processing circuitry, configured to: encode a configuration message for transmission to a user equipment (UE), the configuration message indicating signal selection criteria for cell measurement reporting; encode a synchronization signal (SS) burst set for transmission within a serving cell of the NB, the SS burst set comprising a plurality of new radio synchronization signals (NRSSs); decode a first cell beamforming measurement signal, the first cell beamforming measurement signal based on the SS burst set transmitted within the serving cell and the signal selection criteria; decode a second cell beamforming measurement signal based on a second SS burst set associated with a neighboring cell, the second cell beamforming measurement signal based on signal measurements of NRSSs within the second SS burst set; encode a handover command message for initiating a handover to the neighboring cell, the handover command based on the first cell beamforming measurement signal and the second cell beamforming reference signal; and memory coupled to the processing circuitry, the memory configured to store the signal selection criteria.

In Example 26, the subject matter of Example 25 includes, wherein the processing circuitry is further configured to: decode a radio resource management (RRM) measurement report message from the UE, the measurement report message including the cell beamforming measurement signal.

In Example 27, the subject matter of Examples 25-26 includes, wherein the SS burst set further comprises a NRSS originating from one or more transmission/reception points (TRPs) within the serving cell.

In Example 28, the subject matter of Examples 25-27 includes, wherein the processing circuitry is further configured to: encode higher layer signaling including a signal strength threshold value, the higher layer signaling for transmission to the UE.

In Example 29, the subject matter of Example 28 includes, wherein the first cell beamforming measurement signal indicates signal strength of a summed NRSS using a subset of the plurality of NRSSs associated with a signal strength above the threshold value.

In Example 30, the subject matter of Examples 25-29 includes, wherein the NB is one of a Next Generation Node-B (gNB) or an Evolved Node-B (eNB).

Example 31 is an apparatus of a user equipment (UE), the apparatus comprising: means for decoding a synchronization signal (SS) burst set originating from one or more transmission/reception points (TRPs) within a neighboring cell, the SS burst set comprising a plurality of new radio synchronization signals (NRSSs) received within a serving cell; means for decoding a UE-specific reference signal, the reference signal indicative of data coverage within the neighboring cell; means for generating a cell beamforming measurement signal associated with the neighboring cell, based on signal measurements of the NRSSs within the SS burst set, the cell beamforming measurement signal for transmission to the serving cell; means for decoding a handover command message for initiating a handover to the neighboring cell, the handover command responsive to the cell beamforming measurement signal: and means for determining to initiate a handover procedure from the serving cell to the neighboring cell based on the handover command and the data coverage within the neighboring cell.

In Example 32, the subject matter of Example 31 includes, wherein the UE-specific reference signal is a channel state information reference signal (CSI-RS).

In Example 33, the subject matter of Examples 31-32 includes, means for encoding a radio resource management (RRM) measurement report message for transmission to the serving cell, the measurement report message including the cell beamforming measurement signal.

In Example 34, the subject matter of Examples 31-33 includes, means for decoding a second SS burst set associated with one or more TRPs within the source serving cell: and means for generating a second cell beamforming measurement signal for transmission to the source serving cell, based on signal measurements of NRSSs within the second SS burst set, the handover command message further based on the second cell beamforming measurement signal.

In Example 35, the subject matter of Examples 31-34 includes, means for generating a summed NRSS using a subset of the plurality of NRSSs associated with a signal strength above a threshold: and means for performing measurement on the summed NRSS to generate the cell beamforming measurement signal.

Example 36 is at least one machine-readable medium including instructions that, when executed by processing circuitry, cause the processing circuitry to perform operations to implement of any of Examples 1-35.

Example 37 is an apparatus comprising means to implement of any of Examples 1-35.

Example 38 is a system to implement of any of Examples 1-35.

Example 39 is a method to implement of any of Examples 1-35.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. A non-transitory computer readable memory medium storing program instructions executable by processing circuitry to cause a user equipment (UE) to:
   decode synchronization signals (SSs) associated with a neighboring cell, the SSs comprising a plurality of SSs;
   generate a cell beamforming measurement signal associated with the neighboring cell based on signal measurements of the SSs, wherein the cell beamforming measurement signal includes one or more of:
      a maximum value of the signal measurements of the SSs;
      an average of the signal measurements of the SSs above a threshold; or
      an average of N highest of the signal measurements of the SSs; and
   encode a radio resource management (RRM) measurement report message for transmission to a serving cell, the RRM measurement report message including the cell beamforming measurement signal.

2. The non-transitory computer readable memory medium of claim 1,
   wherein the cell beamforming measurement signal is indicative of signal strength of the SSs originating from the neighboring cell.

3. The non-transitory computer readable memory medium of claim 1,
   wherein the SSs are associated with one or more transmission/reception points (TRPs) within the neighboring cell.

4. The non-transitory computer readable memory medium of claim 1,
   wherein the program instructions are further executable by the processing circuitry to cause the UE to:
      decode additional SSs associated with one or more TRPs within the serving cell; and
      generate a second cell beamforming measurement signal for transmission to the serving cell based on signal measurements of SSs within the additional SSs and signal selection criteria.

5. The non-transitory computer readable memory medium of claim 4,
   wherein the program instructions are further executable by the processing circuitry to cause the UE to:
      decode a handover command message for initiating a handover to a neighbor cell, wherein the handover command message is based on the second cell beamforming measurement signal.

6. The non-transitory computer readable memory medium of claim 1,
   wherein, to generate the cell beamforming measurement signal, the program instructions are further executable by the processing circuitry to cause the UE to perform measurement on one of the plurality of SSs associated with a maximum signal strength among the plurality of SSs.

7. The non-transitory computer readable memory medium of claim 1,
   wherein the program instructions are further executable by the processing circuitry to cause the UE to:
      generate one of an average SS or summed SS using the plurality of SSs;
      perform measurement on one of the average SS or summed SS to generate the cell beamforming measurement signal; and
      normalize one of the average SS or summed SS using one of the plurality of SSs associated with a maximum signal strength.

8. The non-transitory computer readable memory medium of claim 1,
   wherein the program instructions are further executable by the processing circuitry to cause the UE to:
      generate one of an average SS or a summed SS using a subset of the plurality of SSs associated with a signal strength above a threshold; and
      perform measurement on the summed SS to generate the cell beamforming measurement signal.

9. The non-transitory computer readable memory medium of claim 1,
   wherein the program instructions are further executable by the processing circuitry to cause the UE to:
      generate one of an average SS or a summed SS using a subset of the plurality of SSs, wherein the subset of the SSs represents top N synchronization signals with a highest signal strength within the SSs, and wherein N is an integer greater than 1; and perform measurement on one of the average SS or summed SS to generate the cell beamforming measurement signal.

10. A user equipment (UE), comprising:

processing circuitry, wherein the processing circuitry is configured to:

decode synchronization signals (SSs) originating from a neighboring cell;

generate a cell beamforming measurement signal associated with the neighboring cell based on signal measurements of the SSs, the cell beamforming measurement signal for transmission to a serving cell;

after transmission of the cell beamforming measurement signal to the serving cell, decode information for a channel state information reference signal (CSI-RS) measurement of the neighboring cell;

perform the measurements of the CSI-RS of the neighboring cell; and determine to initiate a handover procedure from the serving cell to the neighboring cell based on the measurement of the CSI-RS within the neighboring cell.

11. The UE of claim 10, wherein the cell beamforming measurement signal includes one or more of:

a maximum value of the signal measurements of the SSs;

an average of the signal measurements of the SSs above a threshold; and an average of N highest of the signal measurements of the SSs.

12. The UE of claim 10, wherein the CSI-RS relates to a data coverage of the neighboring cell.

13. The UE of claim 10, wherein the processing circuitry is further configured to:

encode a radio resource management (RRM) measurement report message for transmission to the serving cell, the measurement report message including the cell beamforming measurement signal.

14. The UE of claim 10, wherein the processing circuitry is further configured to:

decode additional SSs associated with one or more TRPs within the serving cell; and generate a second cell beamforming measurement signal for transmission to the serving cell based on signal measurements of NRSSs within the additional SSs.

15. The UE of claim 10, wherein the SSs are associated with one or more transmission/reception points (TRPs) within the neighboring cell.

16. A method for a base station to determine initiation of a handover, comprising:

decoding a cell beamforming measurement signal from a user equipment (LTE) associated with a neighboring cell based on signal measurements of synchronization signals (SSs) associated with the neighboring cell, the SSs comprising a plurality of SSs;

wherein the cell beamforming measurement signal includes one or more of:

a maximum value of the signal measurements of the SSs;

an average of the signal measurements of the SSs above a threshold; or an average of N highest of the signal measurements of the SSs.

17. The method of claim 16, further comprising:

after decoding the cell beamforming measurement signal, encoding information for transmission to the UE for a channel state information reference signal (CSI-RS) measurement of the neighboring cell, wherein the information enables the UE to determine to handover to the neighboring cell based on the CSI-RS measurement.

18. The method of claim 17, wherein the CSI-RS relates to a data coverage of the neighboring cell.

19. The method of claim 16, wherein the SSs are associated with one or more transmission/reception points (TRPs) within the neighboring cell.

20. The method of claim 16, wherein each of the SSs comprise a new radio synchronization signal (NRSS).

* * * * *

UNITED STATES PATENT AND TRADEMARK OFFICE
CERTIFICATE OF CORRECTION

PATENT NO. : 11,617,112 B2
APPLICATION NO. : 17/164561
DATED : March 28, 2023
INVENTOR(S) : Candy Yiu et al.

It is certified that error appears in the above-identified patent and that said Letters Patent is hereby corrected as shown below:

In the Claims

Column 34, Line 16, delete "LTE" and insert --UE--.

Signed and Sealed this
Nineteenth Day of December, 2023

Katherine Kelly Vidal
*Director of the United States Patent and Trademark Office*